(12) United States Patent  (10) Patent No.: US 8,701,030 B2
Lyons et al. (45) Date of Patent: *Apr. 15, 2014

(54) METHOD AND APPARATUS FOR MANAGING WINDOWS

(75) Inventors: David Anthony Lyons, San Jose, CA (US); Patrick Earl McClaughry, Sunnyvale, CA (US); Dan Walkowski, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 938 days.

This patent is subject to a terminal disclaimer.

(21) Appl. No.: 12/816,326

(22) Filed: Jun. 15, 2010

(65) Prior Publication Data

US 2010/0257482 A1  Oct. 7, 2010

Related U.S. Application Data

(63) Continuation of application No. 10/255,899, filed on Sep. 25, 2002, now Pat. No. 7,739,604.

(51) Int. Cl.
*G06F 3/00*  (2006.01)

(52) U.S. Cl.
USPC ........... 715/769; 715/748; 715/781; 715/794; 715/835; 709/213; 709/232; 709/236

(58) Field of Classification Search
USPC ................. 715/781, 769, 794, 835, 748, 796; 709/213
See application file for complete search history.

(56) References Cited

U.S. PATENT DOCUMENTS

| 4,313,113 A | 1/1982 | Thornburg |
| 4,464,652 A | 8/1984 | Lapson et al. |
| 4,484,302 A | 11/1984 | Cason et al. |
| 4,555,775 A | 11/1985 | Pike |
| 4,642,790 A | 2/1987 | Minshull et al. |
| 4,688,167 A | 8/1987 | Agarwal |
| 4,698,624 A | 10/1987 | Barker et al. |

(Continued)

FOREIGN PATENT DOCUMENTS

EP  548709 A2  6/1993

OTHER PUBLICATIONS

IBM Technical Disclosure Bulletin, "Automatic Window Management Mode", vol. 35, No. 4B, Sep. 1992.

(Continued)

*Primary Examiner* — Ryan F Pitaro
(74) *Attorney, Agent, or Firm* — Schwegman Lundberg & Woessner, P.A.

(57) ABSTRACT

Methods and apparatuses to manipulate a window during a drag-and-drop operation. In one aspect of the invention, a method to manipulate a window includes: receiving input of dragging an item to a first window in a first state in which the first window is not completely accessible on a first screen; and bringing the first window from the first state to a second state in which the first window is more accessible or completely accessible on the first screen before the item is dropped. In one example according to this aspect, the first window is brought to the second state in response to a first determination that the first window contains a target location for the item. The first determination is in response to a predetermined input which is one of: a) a determination that the item has hovered around a location in the first window for a predetermined amount of time; and b) an input of pressing a key while the item is being dragged in the first window.

35 Claims, 17 Drawing Sheets

(56) References Cited

U.S. PATENT DOCUMENTS

| | | |
|---|---|---|
| 4,698,625 A | 10/1987 | McCaskill et al. |
| 4,720,703 A | 1/1988 | Schnarel et al. |
| 4,785,296 A | 11/1988 | Tabata et al. |
| 4,786,895 A | 11/1988 | Castaneda |
| 4,831,556 A | 5/1989 | Oono |
| 4,862,376 A | 8/1989 | Ferriter et al. |
| 4,868,765 A | 9/1989 | Diefendorff |
| 4,922,414 A | 5/1990 | Holloway et al. |
| 4,954,967 A | 9/1990 | Takahashi |
| 5,046,001 A | 9/1991 | Barker et al. |
| 5,047,930 A | 9/1991 | Martens et al. |
| 5,060,135 A | 10/1991 | Levine et al. |
| 5,068,804 A | 11/1991 | Watanabe et al. |
| 5,079,695 A | 1/1992 | Dysart et al. |
| 5,140,677 A | 8/1992 | Fleming et al. |
| 5,140,678 A | 8/1992 | Torres |
| 5,157,763 A | 10/1992 | Peters et al. |
| 5,196,838 A | 3/1993 | Meier et al. |
| 5,202,828 A | 4/1993 | Vertelney et al. |
| 5,214,756 A | 5/1993 | Franklin et al. |
| 5,226,117 A | 7/1993 | Miklos |
| 5,226,163 A | 7/1993 | Karsh et al. |
| 5,228,123 A | 7/1993 | Heckel |
| 5,252,951 A | 10/1993 | Tannenbaum et al. |
| 5,260,697 A | 11/1993 | Barrett et al. |
| 5,261,043 A | 11/1993 | Wolber et al. |
| 5,287,448 A | 2/1994 | Nicol et al. |
| 5,301,268 A | 4/1994 | Takeda |
| 5,305,435 A | 4/1994 | Bronson |
| 5,309,555 A | 5/1994 | Akins et al. |
| 5,315,703 A | 5/1994 | Matheny et al. |
| 5,317,687 A | 5/1994 | Torres |
| 5,333,256 A | 7/1994 | Green et al. |
| 5,333,298 A | 7/1994 | Bland et al. |
| 5,339,392 A | 8/1994 | Risberg et al. |
| 5,341,293 A | 8/1994 | Vertelney et al. |
| 5,371,844 A | 12/1994 | Andrew et al. |
| 5,371,851 A | 12/1994 | Pieper et al. |
| 5,392,390 A | 2/1995 | Crozier |
| 5,400,057 A | 3/1995 | Yin |
| 5,422,993 A | 6/1995 | Fleming |
| 5,475,399 A | 12/1995 | Borsuk |
| 5,561,444 A | 10/1996 | Johnston, Jr. et al. |
| 5,579,521 A | 11/1996 | Shearer et al. |
| 5,583,984 A | 12/1996 | Conrad et al. |
| 5,598,524 A | 1/1997 | Johnston, Jr. et al. |
| 5,608,860 A | 3/1997 | Fitzpatrick et al. |
| 5,621,878 A | 4/1997 | Owens et al. |
| 5,657,049 A | 8/1997 | Ludolph et al. |
| 5,694,151 A | 12/1997 | Johnston, Jr. et al. |
| 5,696,915 A | 12/1997 | Johnston, Jr. et al. |
| 5,745,096 A | 4/1998 | Ludolph et al. |
| 5,754,178 A | 5/1998 | Johnston, Jr. et al. |
| 5,786,818 A | 7/1998 | Brewer et al. |
| 5,825,348 A | 10/1998 | Ludolph et al. |
| 5,825,360 A | 10/1998 | Odam et al. |
| 5,859,639 A | 1/1999 | Ebrahim |
| 5,969,705 A | 10/1999 | Fisher et al. |
| 5,999,178 A | 12/1999 | Hwang et al. |
| 6,061,058 A | 5/2000 | Owens et al. |
| 6,061,061 A | 5/2000 | Conrad et al. |
| 6,133,898 A | 10/2000 | Ludolph |
| 6,212,577 B1 | 4/2001 | Stern et al. |
| 6,396,474 B1 | 5/2002 | Johnson, Jr. et al. |
| 6,411,312 B1 | 6/2002 | Sheppard |
| 6,535,230 B1 | 3/2003 | Celik |
| 6,535,930 B2 | 3/2003 | Stern et al. |
| 6,628,309 B1 | 9/2003 | Dodson et al. |
| 6,642,944 B2 | 11/2003 | Conrad et al. |
| 6,654,036 B1 | 11/2003 | Jones |
| 6,690,356 B2 | 2/2004 | Johnston, Jr. et al. |
| 6,907,576 B2 | 6/2005 | Barbanson et al. |
| 6,915,490 B1 | 7/2005 | Ewing |
| 6,928,621 B2 | 8/2005 | Conrad et al. |
| 7,739,604 B1 | 6/2010 | Lyons et al. |
| 2003/0076362 A1 | 4/2003 | Terada |
| 2003/0197739 A1 | 10/2003 | Bauer |
| 2003/0222915 A1 | 12/2003 | Marion et al. |
| 2004/0085368 A1 | 5/2004 | Johnson, Jr. et al. |
| 2005/0198585 A1 | 9/2005 | Haynes |

OTHER PUBLICATIONS

D. Brininstool et al., "Notebook Tabs as Target Location for Drag/Drop Operations" IBM Technical Disclosure Bulletin, vol. 35, No. 7, Dec. 1992.

Microsoft Windows, User's Guide (Version 3.0) 1985-1990, pp. 103-131.

Logitech, Microsoft Windows, Version 3.0, 1985-1990, pp. 84-95.

Claris Corporation, 1988, "MacDrawll", portions thereof including pp. 28-30.

"Inside Macintosh: vol. 1", Addison-Wesley Publishing Company, © 1985, Table of Contents (6 pgs) and pp. 1-1 to 1-6 and pp. 1-37 to 1-50.

Charles Wiecha et al., "ITS: A Toll for Rapidly Developing Interactive Applications", IBM, T.J. Watson Research Center, 1990, pp. 204-236.

Niels P. Mayer, "The WINTERP Widget INTERPreter—A Lisp Prototyping and Extension Environment for OSF/Motif-based Applications and User-Interfaces", Hewlett-Packard Laboratories, Human-Computer Interaction Department, © 1990, pp. IV-1.45 to IV-1.60.

Introduction to DOS version 4.01; http://cftb.net/downloads/introtodos.pdf, 39 pgs.

Unix 101, http://www.csc.calpoly.edu/~csc101/Computing/mhutchen/unix101.html, pp. 1-7.

Craig Danuloff et al., "The Page Maker Companion: Macintosh Version 4.0", Richard D. Irwin, Inc., 1990, portions thereof including Chapter 11 (pp. 339-382).

"Inset Systems releases HiJaak for Windows; popular conversion utility includes image viewing and processing", Seybold Report on Desktop Publishing, vol. 6, No. 11, p. 28 (1), Jul. 6, 1992.

The Official Microsoft Courseware, "Microsoft Windows 3.1—Step by Step", Catapult, Microsoft Press, 5 pages.

Apple Computer, Inc., "Inside Macintosh, vol. VI", Table of Contents, 5-1 through 6-117, 1991.

Bonner, Paul, "Windows 3.1: Faster and Smarter: the latest release of windows vastly improves performance and reliability", PC-Computing, vol. 5, No. 5, p. 128 (12), May 1992.

Burk, Ron, "Windows 3.1", Windows—DOS Developer's Journal, vol. 3, No. 3, p. 53 (6), Mar. 1992.

Eskelin, Philip B. Jr., "WPRINT lets you print easily in Windows 3.1", PC Magazine, vol. 11, No. 8, p. 393 (7), Apr. 28, 1992.

Finnie, J. Scot, "XTree shines under Windows—despite a few shortcomings", PC-Computing, vol. 5, No. 8, p. 42 (2), Aug. 1992.

Future Enterprises, Inc., "A Microcomputer Education Course for: US Department of Commerce, Patent and Trademark Office—Student Workbook for: Quattro Pro 3.0, Concepts and Basic Uses", 3 pages.

Grevstad, Eric, "Norton Desktop 2.0 for Windows; the Norton Desktop still does windows better than Windows", Lotus, vol. 8, No. 4, p. 82 (2), Apr. 1992.

Mendelson, Edward, "Drag-and-Drop multiple image files to new formats", Windows Sources, vol. 1, issue: No. 4, p. 222 (1), May 1993.

MS-DOS 4.01, Titles: Phoenix Comp. MS-DOS 4.01, Phoenix Computer Products, 1981-1988.

Petzold, Charles, "Windows 3.1—Hello to TrueType, OLE, and Easier DDE; Farewell to Real Mode", Microsoft Systems Journal, Sep. 1991, p. 17-26.

Powell, James E., "HiJaak 1.0", Windows Magazine, 1992, No. 311, 310, 2 pages.

Richter, Jeffrey, "Drop Everything: How to Make your Application Accept and Source Drag-and-Drop Files", Microsoft Systems Journal, May-Jun. 1992, p. 19-30.

Richter, Jeffrey M., "Windows 3.1: A Developer's Guide—$2^{nd}$ Edition", CoversVersion 3.1 Table of Contents and Chapter 9.

(56) References Cited

OTHER PUBLICATIONS

"Word Perfect for Windows", Screen Dumps from Microsoft Windows, Version 5.1, WordPerfect Corporation, 1991, 16 pages.
"U.S. Appl. No. 10/255,899, Examiner Interview Summary mailed Aug. 20, 2007", 2 pgs.
"U.S. Appl. No. 10/255,899, Final Office Action mailed Apr. 9, 2008", 25 pgs.
"U.S. Appl. No. 10/255,899, Final Office Action mailed Apr. 10, 2007", 21 pgs.
"U.S. Appl. No. 10/255,899, Final Office Action mailed Apr. 28, 2009", 29 pgs.
"U.S. Appl. No. 10/255,899, Non Final Office Action mailed Sep. 3, 2009", 30 pgs.
"U.S. Appl. No. 10/255,899, Non Final Office Action mailed Sep. 7, 2006", 19 pgs.
"U.S. Appl. No. 10/255,899, Non Final Office Action mailed Oct. 2, 2008", 27 pgs.
"U.S. Appl. No. 10/255,899, Non Final Office Action mailed Oct. 9, 2007", 25 pgs.
"U.S. Appl. No. 10/255,899, Non Final Office Action mailed Dec. 16, 2005", 29 pgs.
"U.S. Appl. No. 10/255,899, Notice of Allowance mailed Feb. 1, 2010", 6 pgs.
"U.S. Appl. No. 10/255,899, Notice of Non Compliant Amendment mailed May 31, 2006", 2 pgs.
"U.S. Appl. No. 10/255,899, Response filed Jan. 9, 2008 to Non Final Office Action mailed Oct. 9, 2007", 37 pgs.
"U.S. Appl. No. 10/255,899, Response filed Feb. 2, 2009 to Non Final Office Action mailed Oct. 2, 2008", 34 pgs.
"U.S. Appl. No. 10/255,899, Response filed Mar. 16, 2006 to Non Final Office Action mailed Dec. 16, 2005", 37 pgs.
"U.S. Appl. No. 10/255,899, Response filed Jun. 15, 2006 to Notice of Non Compliant Amendment mailed May 31, 2006", 37 pgs.
"U.S. Appl. No. 10/255,899, Response filed Jul. 9, 2008 to Final Office Action mailed Apr. 9, 2008", 32 pgs.
"U.S. Appl. No. 10/255,899, Response filed Jul. 10, 2007 to Final Office Action mailed Apr. 10, 2007", 30 pgs.
"U.S. Appl. No. 10/255,899, Response filed Jul. 28, 2009 to Final Office Action mailed Apr. 28, 2009", 46 pgs.
"U.S. Appl. No. 10/255,899, Response filed Dec. 2, 2009 to Non Final Office Action mailed Sep. 3, 2009", 39 pgs.
"U.S. Appl. No. 10/255,899, Response filed Dec. 7, 2006 to Non Final Office Action mailed Sep. 7, 2006", 29 pgs.
"U.S. Appl. No. 10/255,899, Supplemental Amendment filed Aug. 29, 2007", 31 pgs.

METHOD AND APPARATUS FOR MANAGING WINDOWS

This application is a continuation of U.S. patent application Ser. No. 10/255,899, filed on Sep. 25, 2002 now U.S. Pat. No. 7,739,604.

FIELD OF THE INVENTION

The invention relates to graphical user interfaces, and more particularly to window management during a drag operation.

BACKGROUND OF THE INVENTION

Drag-and-drop operations are used in many Graphical User Interfaces (GUI) to facilitate user friendly methods of directing data communications for an application or between applications. For example, an item is dragged when a mouse button is pressed and held down while the cursor is over the item. Moving the mouse while the mouse button is held down moves the item from one position to another thereby "dragging" the item. When the mouse button is finally released, the dragged item is dropped at the location where the cursor is when the mouse button is released. Thus, the drag-and-drop operation defines a source location and a destination location for a data communication operation; and the data communication operation associated with the drag-and-drop operation (e.g., copy, move, print) is performed on the data represented by the dragged item. For example, U.S. Pat. No. 6,212,577 describes various methods used in a drag-and-drop operation (e.g., providing feedback, communicating data with different formats).

While drag-and-drop operations are typically performed according to input from pointing devices (e.g., mouse, track ball, touch pad, touch screen), which can provide continuously varying input depending on a position of the device to correlate a motion of the input device with the motion of a dragged item, other input devices (e.g., keyboard or voice recognition) can also be used to provide similar inputs (e.g., pressing and/or releasing arrow keys). Thus, it will be understood that an input of dragging and dropping an item may be from one of various different input devices, which are interpreted by a digital processing system as input for dragging and dropping the item.

SUMMARY OF THE DESCRIPTION

Methods and apparatuses to manipulate a window during a drag-and-drop operation are described here. The following provides a summary of some, but not all, embodiments described in this disclosure; it will be appreciated that certain embodiments which are claimed will not be summarized here. In one embodiment, an item on a display device (e.g., an icon representing a user's word processing document, such as a "to do list") is selected with a cursor through a cursor control device (such as one of a mouse, or touchpad or touchscreen or trackball or keyboard or voice recognition). The selection of the item is maintained while the item is moved on the display device, thus having the appearance of being dragged on the screen of the display device; hence, this may be referred to as a drag operation. During a drag operation, the item may be dragged over the area of a window which is partially obscured by another window or is partially off-screen, and, as a result of the drag operation over this area, the window (which is partially obscured or partially off-screen) changes state to appear as a front-most window (or at least in front of the window obscuring it) and if it was partially off-screen it moves to at least reveal more area within the window (and preferably moves entirely onto the screen and, if necessary shrinks to fit onto that screen). If during the drag operation, but before the item is "dropped", the item leaves the window which has changed its state as a result of the drag operation (or if the drag operation is canceled), the window returns to its prior state (e.g., returns to the original position, size and window hierarchy). If the item is "dropped" into the window which has changed its state, then the window remains a front most window (and if it was partially off-screen but was moved at least further on-screen, then it remains at least further on-screen).

In one aspect of the invention, a method to manipulate a window includes: receiving input of dragging an item in a first window in a first state in which the first window is not completely accessible (e.g., the first window is partially viewable but partially off screen) on a first screen; and bringing the first window from the first state to a second state in which the first window is more accessible or completely accessible on the first screen in response to the dragging or before the item is dropped. In one example according to this aspect, the first window is brought to the second state in response to a first determination that the first window contains a target location for the item. The first determination is in response to a predetermined input which is one of: a) a determination that the item has hovered around a location in the first window for a predetermined amount of time; and b) an input of pressing a key (e.g., the space key) while the item is being dragged in the first window.

In one example, the first window is returned from the second state to the first state in response to a second determination that the first window does not contain the target location for the item. The second determination is in response to a predetermined input which is one of: a) an input of pressing a key (e.g., the Esc key) while the item is being dragged in the first window; and b) an input of dragging the item outside the first window.

In one example, after receiving input of dropping the item in the first window, the first window is returned from the second state to the first state in response to a failure in an operation associated with dropping the item (e.g., the first window failed to accept the data associated with the item). In another example, after receiving input of dropping the item in the first window, the first window remains in the second state even when there is a failure in an operation associated with dropping the item.

In one example, to bring the first window to the second state, a window layout hierarchy is changed for the first window to reveal a first portion of the first window, which is covered by a second window on the first screen when the first window is in the first state. The second portion is displayed on top of the second window when the first window in the second state.

In another example, to bring the first window to the second state, the first window is repositioned in the first screen to reveal a second portion of the first window, which is invisible on the first screen when the first window is in the first state (e.g., because the second portion was "off-screen"). When the first window is in the first state, the second portion of the first window is: a) located outside the first screen ("off screen"); b) displayed on a second screen; or c) covered by a third window on the first screen.

In a further example, to bring the first window to the second state, the first window is resized in the first screen to reveal a third portion of the first window, the third portion of the first window being invisible on the first screen when the first window is in the first state. When the first window is in the first state, the third portion of the first window is: a) located outside the first screen; b) displayed on a second screen; or c) covered by a third window on the first screen.

The present invention includes methods and apparatuses which perform these methods, including data processing systems which perform these methods, and computer readable media which when executed on data processing systems cause the systems to perform these methods.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention.

Figure 1:
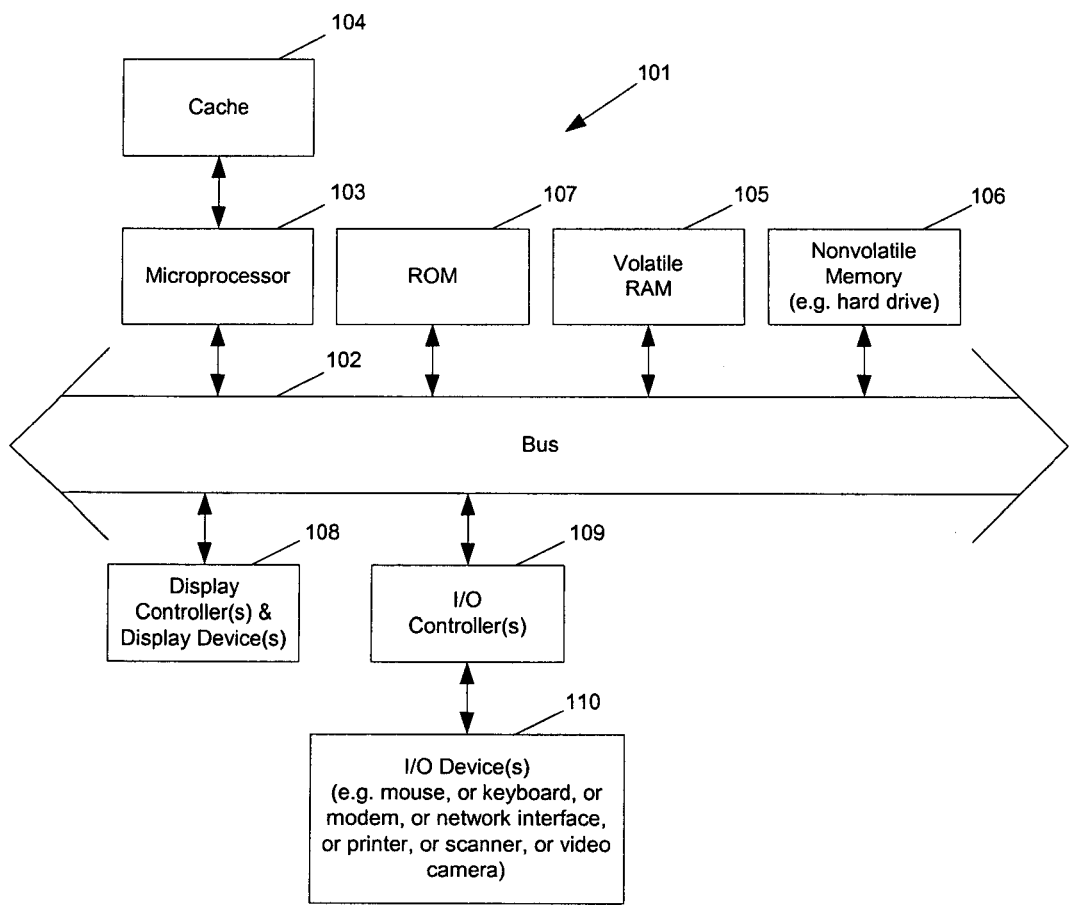
FIG. 1 shows a block diagram example of a data processing system which may be used with the present invention.

FIG. 1 shows one example of a typical computer system which may be used with the present invention. Note that while FIG. 1 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. The computer system of FIG. 1 may, for example, be an Apple Macintosh computer.

As shown in FIG. 1, the computer system 101, which is a form of a data processing system, includes a bus 102 which is coupled to a microprocessor 103 and a ROM 107 and volatile RAM 105 and a non-volatile memory 106. The microprocessor 103, which may be, for example, a G3 or G4 microprocessor from Motorola, Inc. or IBM is coupled to cache memory 104 as shown in the example of FIG. 1. The bus 102 interconnects these various components together and also interconnects these components 103, 107, 105, and 106 to a display controller and display device 108 and to peripheral devices such as input/output (I/O) devices which may be mice, keyboards, modems, network interfaces, printers, scanners, video cameras and other devices which are well known in the art. Typically, the input/output devices 110 are coupled to the system through input/output controllers 109. The volatile RAM 105 is typically implemented as dynamic RAM (DRAM) which requires power continually in order to refresh or maintain the data in the memory. The non-volatile memory 106 is typically a magnetic hard drive or a magnetic optical drive or an optical drive or a DVD RAM or other type of memory systems which maintain data even after power is removed from the system. Typically, the non-volatile memory will also be a random access memory although this is not required. While FIG. 1 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 102 may include one or more buses connected to each other through various bridges, controllers and/or adapters as is well known in the art. In one embodiment the I/O controller 109 includes a USB (Universal Serial Bus) adapter for controlling USB peripherals, and/or an IEEE-1394 bus adapter for controlling IEEE-1394 peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 107, volatile RAM 105, non-volatile memory 106, cache 104 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

A machine readable media can be used to store software and data which when executed by a data processing system causes the system to perform various methods of the present invention. This executable software and data may be stored in various places including for example ROM 107, volatile RAM 105, non-volatile memory 106 and/or cache 104 as shown in FIG. 1. Portions of this software and/or data may be stored in any one of these storage devices.

Thus, a machine readable media includes any mechanism that provides (i.e., stores and/or transmits) information in a form accessible by a machine (e.g., a computer, network device, personal digital assistant, manufacturing tool, any device with a set of one or more processors, etc.). For example, a machine readable media includes recordable/non-recordable media (e.g., read only memory (ROM); random access memory (RAM); magnetic disk storage media; optical storage media; flash memory devices; etc.), as well as electrical, optical, acoustical or other forms of propagated signals (e.g., carrier waves, infrared signals, digital signals, etc.); etc.

In some systems, when an item is dragged to a spring-loaded folder, a window for the spring-loaded folder is opened automatically so that the user can find a desirable location in the folder for dropping the item. If the user drags the item outside the folder before dropping the item, the window for the spring-loaded folder is closed automatically so that the user may find the destination location in other windows. FIGS. 2-6 illustrate scenarios for dragging an item to a spring-loaded folder. It will be understood that "dragging" involves associating a cursor or other icon with another icon (e.g., a folder or document icon) and causing the movement of the another icon under control of the cursor (or other icon) through an input device (such as a mouse or trackball or touchpad or touch screen or keyboard or voice recognition). At the end of the desired movement, the another icon is dropped by ending the association (e.g., by releasing the depressed mouse button which began the drag) between the cursor and the another icon. This normally causes the relocation of the another icon which has been dragged from on location where the "drag" began to the location where the another icon was dropped.

Figure 2:
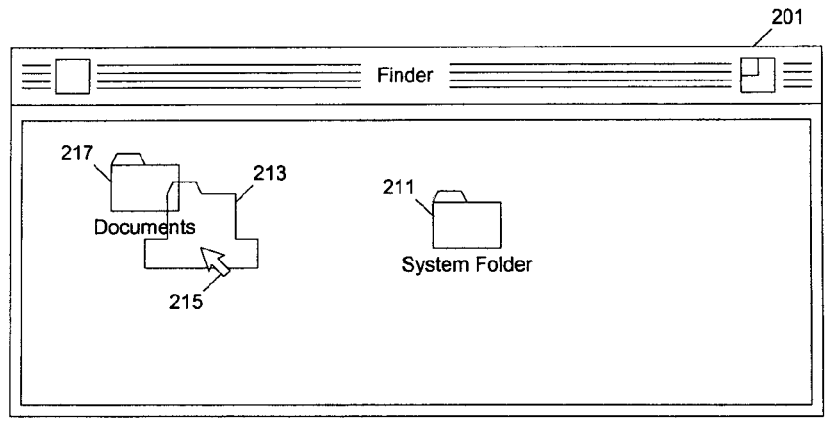
FIGS. 2-6 illustrate scenarios for dragging an item to a what may be referred to as a spring-loaded folder.
Figure 3:
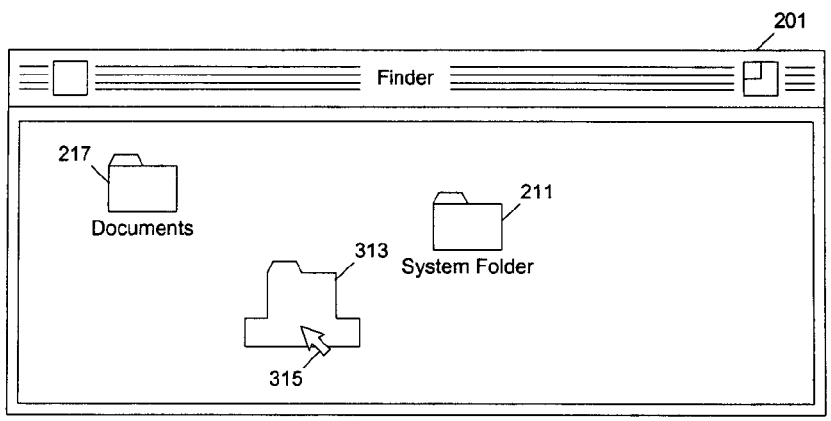
Figure 4:
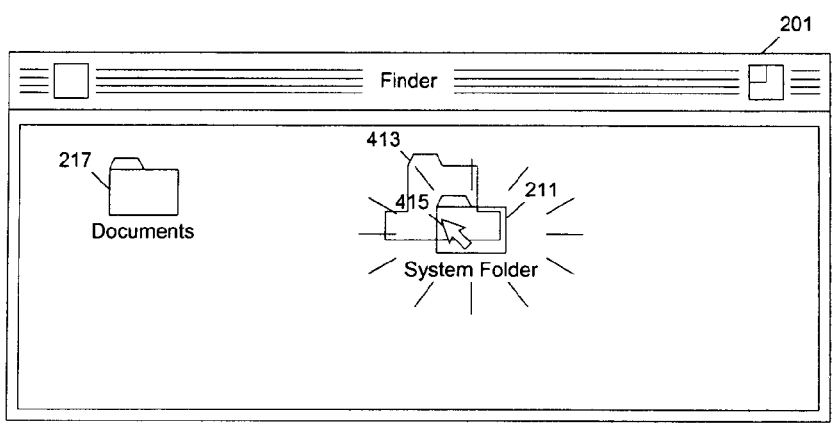
Figure 5:
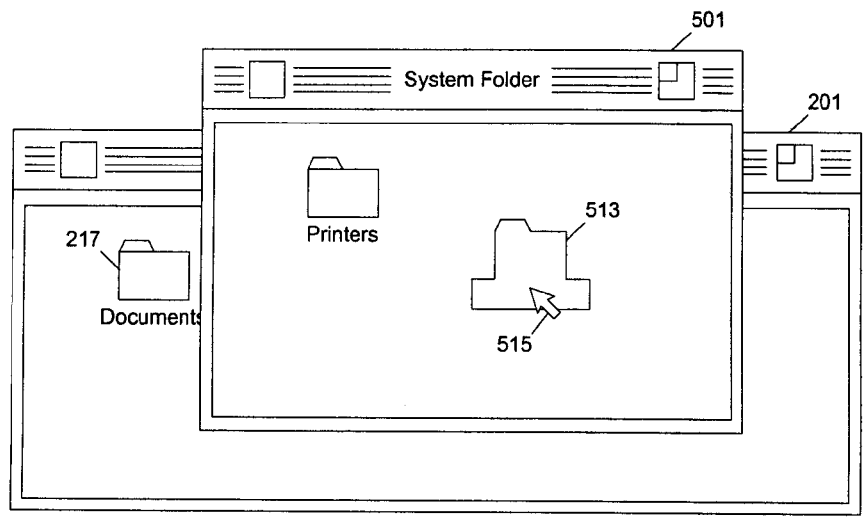
Figure 6:
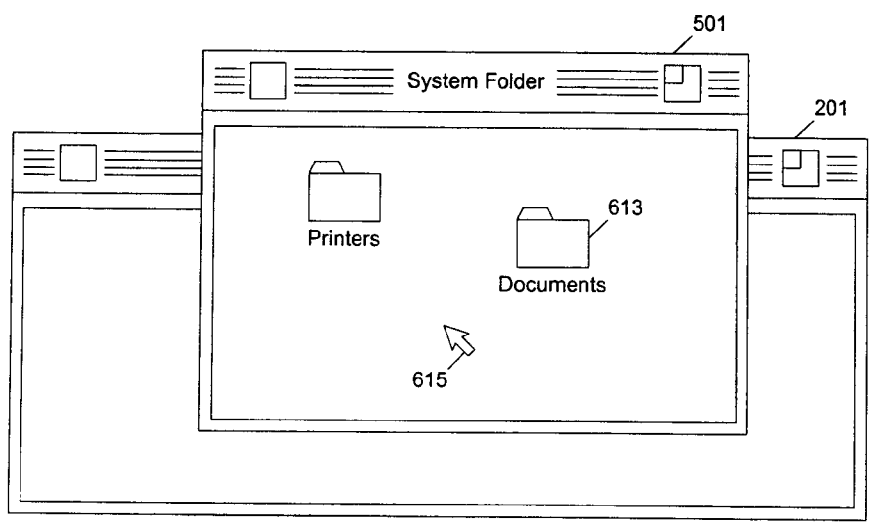

In FIG. 2, window 201 is completely accessible and visible on a screen. It is completely accessible because the area within the borders of window 201 is completely accessible; this normally means that all borders of the window are also viewable. Item 217 with the viewable area of window 207 represents a folder. When the user drags item 217 to move the folder from one location to another, an outline of item 217 is displayed to indicate the current location of the dragged item. For example, outline 213 moves with cursor 215 as the user drags the item on the screen. When the user moves the cursor to position 315 in FIG. 3, outline 313 shows the current position of the dragged item. When the user drags the item over spring-loaded folder 211, as indicated by the position of cursor 415 and outline 413 in FIG. 4, folder 211 blinks to indicate that the spring-loaded folder is ready to open. If the user keeps the dragged item over the blinking folder to confirm that the spring-loaded folder is a destination, the spring-loaded folder is opened automatically to show window 501, as shown in FIG. 5. Thus, the user can find a destination location within window 501 to drop the dragged item. If the user drops the item in window 501, folder 217 is moved from window 201 into location 613 in window 501, as shown in FIG. 6. Window 501 remains open after folder 613 is successfully moved into window 501. However, if the user further drags the item outside window 501, for example to a location as indicated by the position of outline 313 and cursor 315 in FIG. 3, window 513 is closed automatically to return to the situation in FIG. 3. In another scenario, if the operation of moving folder 217 into window 501 fails, window 501 is closed automatically to return to the window layout before the item is dragged and dropped.

Typically, when a user drags an item to a destination window and discovers that the desired destination location in the destination window is inaccessible because the desired location is off screen or is covered by another window, the user may cancel the drag operation (e.g., by ending it near the starting location, or in a location where the dragged item is not accepted, such as a menu bar), or drop temporarily in one location that is accessible in the destination window. The user must re-arrange the window (e.g., move the window which is partially off screen to a position in which the window is more accessible) to make the desired destination location visible on the screen to re-attempt the drag operation, or move the item from the temporarily location to the desired destination location.

Although an outline of a dragged item is used to show the current position of the dragged item in various figures, it is understood that different types of feedbacks can be used to indicate the current position of the dragged item (e.g., a copy of the image of the dragged item, or a modified version of the image of the dragged item, or an icon for the type of the data represented by the dragged item).

At least one embodiment of the present invention seeks to make a partially inaccessible window completely visible (or at least more accessible) as a result of a drag before a drop occurs so that the user can find the exact destination location within the window during a drag-and-drop operation.

An open window is different than a closed folder, such as a closed folder in an open window. For example, an open window, such as a window which shows a list of files and closed folders in a viewable area of the window, shows at least a portion of the contents of the window. A closed folder, on the other hand, does not reveal its contents until it is opened. Further, the individual contents of the window are manipulable (e.g., they can be deleted or copied or dragged and dropped), while this is not possible with a closed folder). A closed folder is typically represented as an icon in an open window or a desktop environment in a graphical user interface system, or as a list entry in an open window.

Figure 7:
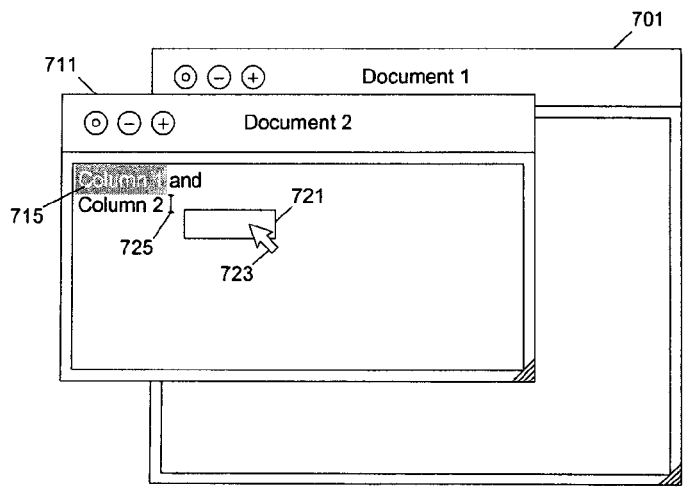
FIGS. 7-12 illustrate scenarios for dragging an item to a what may be referred to as a spring-loaded window according to one embodiment of the present invention.
Figure 8:
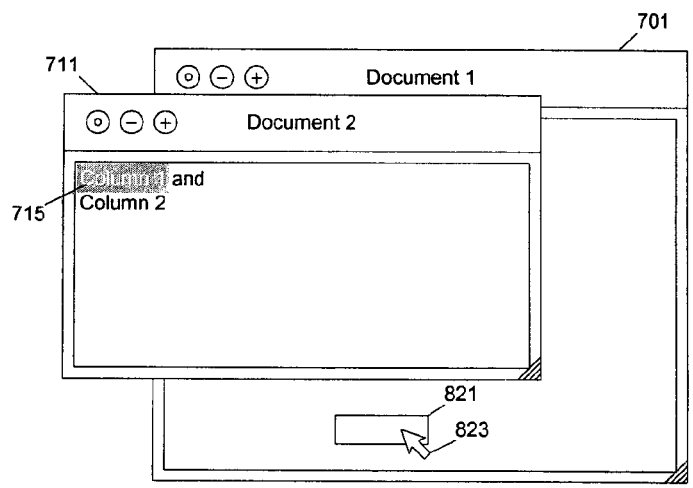

FIGS. 7-12 illustrate scenarios for dragging an item to a spring-loaded window according to one embodiment of the present invention. In FIG. 7, window 701 is partially accessible and partially inaccessible. A portion of window 701 is covered by window 711 thus making the covered portion of window 701 inaccessible. Selected item 715 is dragged to a position indicated by cursor 723 and outline 721, which has the shape of the dragged item. Cursor 725 indicates that if the item is dropped at the position of outline 721, the dropped item will be accepted by window 711 at the location indicated by cursor 725 (e.g., item 715 will be moved to the position of cursor 725 if the user drops the item at the location of outline 721). The selected item 715 may be dragged outside of window 711 and into an accessible area of window 701; FIG. 8 shows a result of dragging item 715 (represented by outline 821) into an accessible area of window 701, while window 701 remains behind window 711.

Figure 9:
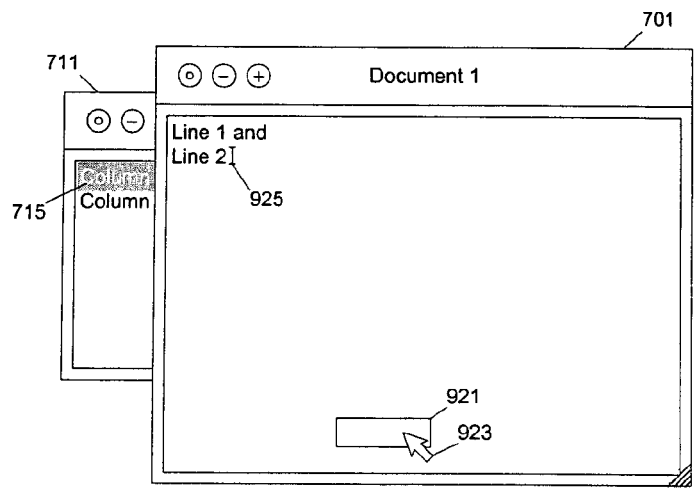
Figure 10:
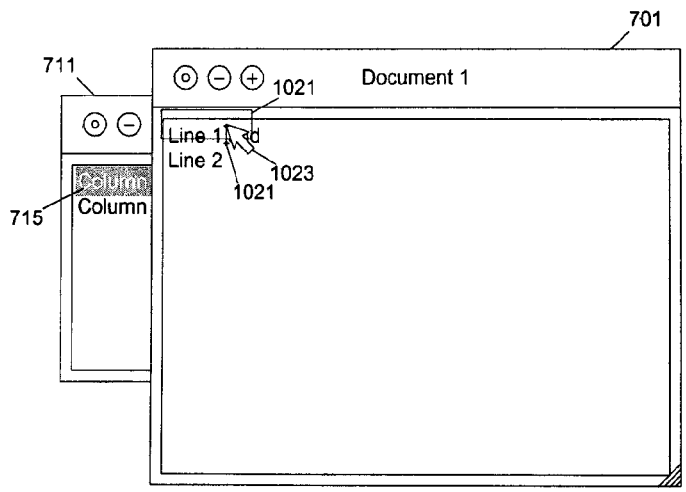
Figure 11:
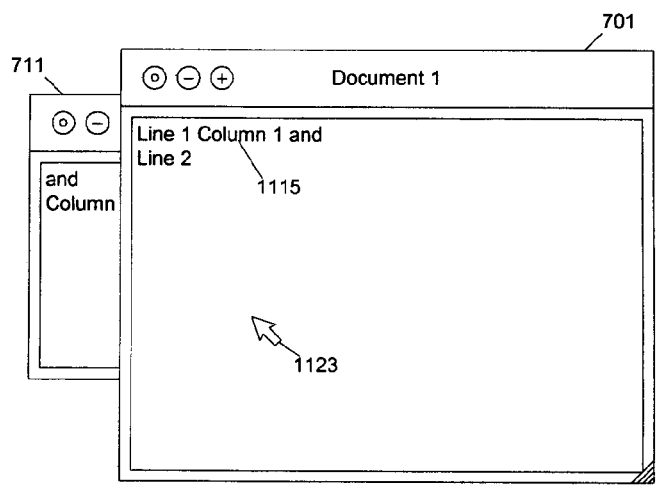

In one scenario, cursor 823 drags outline 821 into window 701 as shown in FIG. 8. Since a portion of window 701 is covered by window 711, the user cannot access the portion of window 701 to precisely indicate the destination for dropping the dragged item in that portion of the window. After cursor 823 is paused near (or hovers over) a location or region in window 701 for a short period of time, the window layout hierarchy is changed so that window 701 is brought above window 711, as shown in FIG. 9, to reveal the portion that was covered by window 711 in FIG. 8. In FIG. 9, window 701 is completely visible (accessible) as a result of the dragging of item 715 before item 715 is dropped into the window. Cursor 925 optionally indicates the location where window 701 will accept the item if the dragged item is dropped at the location indicated by outline 921 and cursor 923. Since window 701 is now completely accessible, the user may drag the item to the exact destination location (rather than the location indicated by cursor 925). For example, the user may drag the item to a location indicated by outline 1021 and cursor 1023 in FIG. 10 so that window 701 will accept the item at the location indicated by cursor 1021. If the user drops the item at the position as shown in FIG. 10, item 715 is moved from window 711 to position 1115 in window 701, as shown in FIG. 11.

Figure 12:
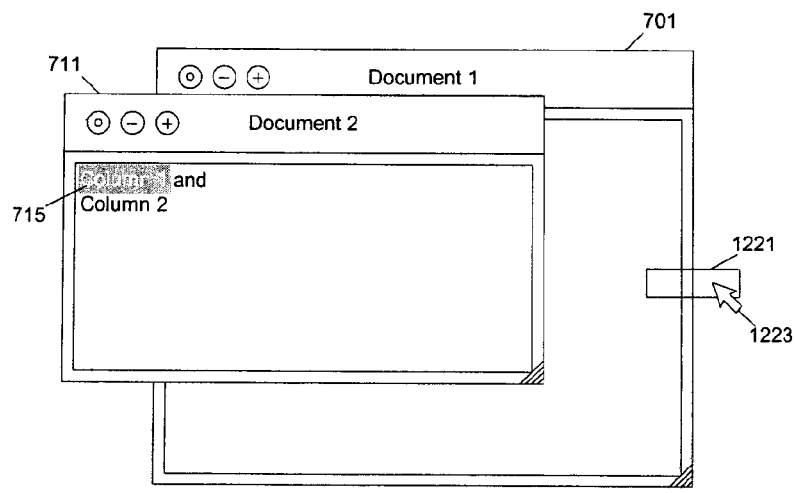

However, if the user decides that the destination location is not in window 701, the user may drag the item from the position in FIG. 9 (or FIG. 10) to the position indicated by outline 1221 and cursor 1223 in FIG. 12. Since the item is dragged outside window 701, window 701 is brought back to the original position in the window layout hierarchy, where a portion of window 701 is covered by window 711, as shown in FIG. 12.

While FIGS. 7-12 illustrate scenarios for dragging of information between windows of one or more application programs (such as one or more word processing or text editing programs), the scenarios of these figures also apply to dragging of iconic representations of files or folders between overlapping windows in a file management system, such as the "Finder" on Macintosh Operating Systems. For example, item 715 may be an iconic representation of a file or folder within a window ("source window") which is dragged to another window ("target window") which is partially obscured by the window or other windows (or is off screen). In this case, the source and target windows are typically representing opened folders in a file directory system of an operating system and thus display files and folders (e.g., subdirectories) within each window.

Also, while FIGS. 7-12 illustrate scenarios in which the window, which is the source of the item being dragged, is over and hence obscuring the target window which receives the item being dragged, it will be understood that the scenarios of these figures also apply to situations in which the source window does not obscure or overlap the target window but at least one other window overlaps and obscures the target window. In this situation, a dragging of an item from the source window to a target window will cause the target window to appear front most relative to the windows which had covered it prior to receiving the dragged item.

In the scenarios of FIGS. 7-12, a delay period (e.g., a short period of time) is used in a preferred embodiment to determine that a change in window layout hierarchy should occur in response to the dragging of an item. This is a desirable feature since without this feature, background windows would spring to become foreground windows whenever a dragged item appears in an area of the window, and the resulting springing forward of background windows would be distracting and possibly disorienting to a user (and would require additional processing effort on the part of the data processing system which would be required to spring the background windows forward). In one exemplary embodiment, this delay period is a predetermined period of time which is used to determine how long a cursor remains in a location (or two-dimensional region) of a display. If the cursor, during a drag, remains in a region of background window for more than the predetermined period of time, then the background window becomes a foreground window allowing access to obscured area of the window. Alternatively, a threshold dragging velocity (e.g., a movement of a dragged item across the screen at or less than a certain velocity) may be used to determine that a user wishes to bring a background window forward whenever the velocity of a dragged item over a background window is less than the threshold dragging velocity. Another alternative may use a keyboard command (e.g., pressing the space bar) while dragging an item to an obscured background window to indicate that the background window should be brought forward so that it is not obscured. It will also be appreciated that a combination of these features may be used to signal when a background window should be brought forward.

Figure 13:
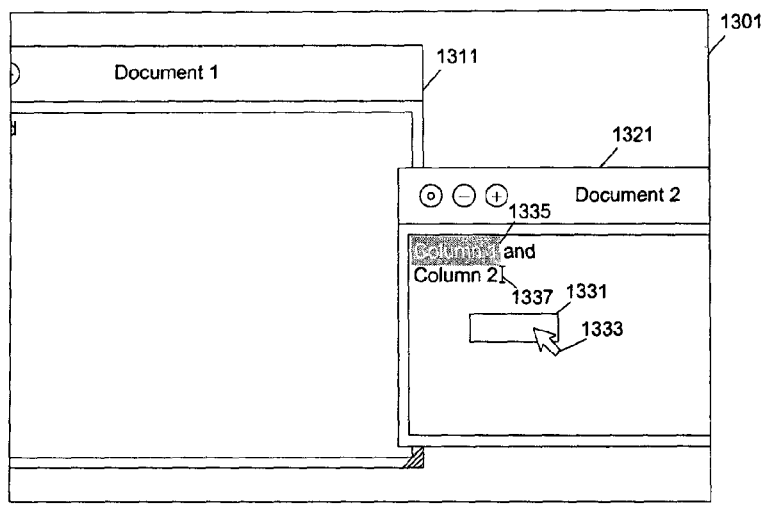
FIGS. 13-18 illustrate other scenarios for dragging an item to a spring-loaded window according to one embodiment of the present invention.

FIGS. 13-18 illustrate other scenarios for dragging an item to a spring-loaded window according to one embodiment of the present invention. In FIG. 13, only portions of windows 1321 and 1311 are displayed on screen 1301. Thus, windows 1311 and 1321 are partially inaccessible on screen 1301, because portions of these windows are off screen. A window is considered "off screen" when at least one border (and usually it is two borders) are clipped by the screen's edge(s) (e.g., the edge or edges of the displayable area of a display device such as a CRT Cathode Ray Tube (CRT) or Liquid Crystal Display (LCD) device). Outline 1331 and cursor 1333 indicate that the selected item 1335 is dragged to a position, where if dropped the item will be move to the position indicated by cursor 1337.

Figure 14:
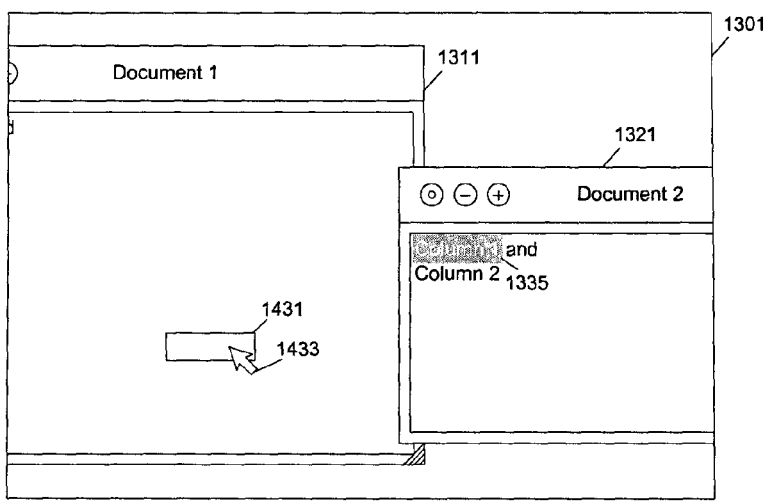
Figure 15:
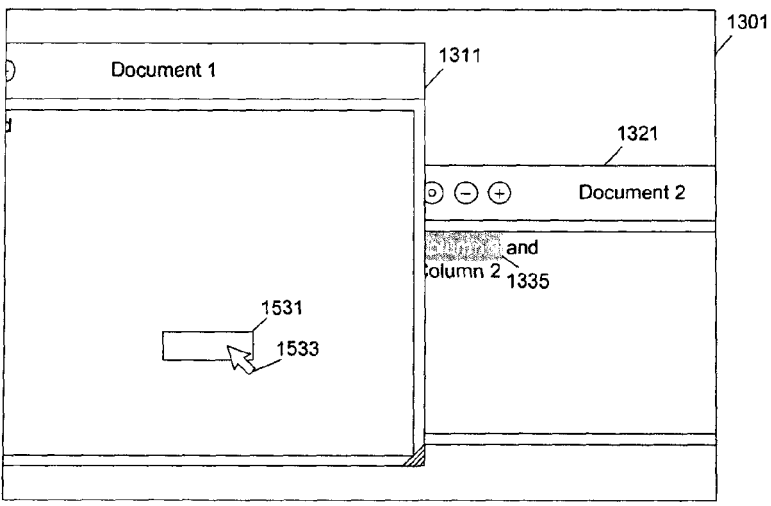
Figure 16:
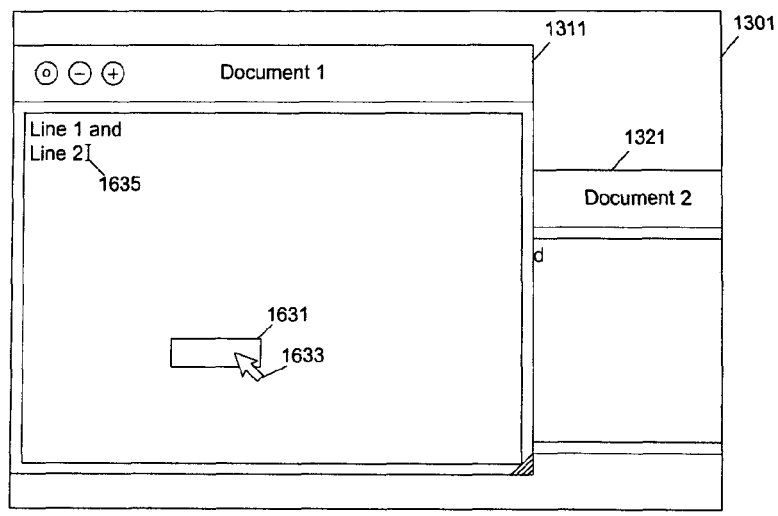

In one scenario, when the item is dragged into window 1311, as shown in FIG. 14. The user may press a short-cut key (e.g., the space key), or pause the dragged item at a location or region in the window, to indicate that a destination is in window 1311. A change in the window layout hierarchy brings window 1311 to the front, as shown in FIG. 15 in response to this indication. However, since window 1311 is partially off screen, changing the window hierarchy is not enough to make the entire window accessible on screen 1301. Thus, window 1311, in response to this indication, slides or is otherwise moved onto screen 1301 to the position as shown in FIG. 16 to make window 1311 completely accessible or at least more accessible. Therefore, the user can see optional cursor 1635 where window 1311 will accept the item if the dragged item is dropped at the location indicated by outline 1631 and cursor 1633. If the window 1311 is too large to fit on the screen it may also be automatically resized to fit on the screen such that all of the window's borders can be seen or at least all of the area within the window's borders can be seen on the display screen.

Figure 17:
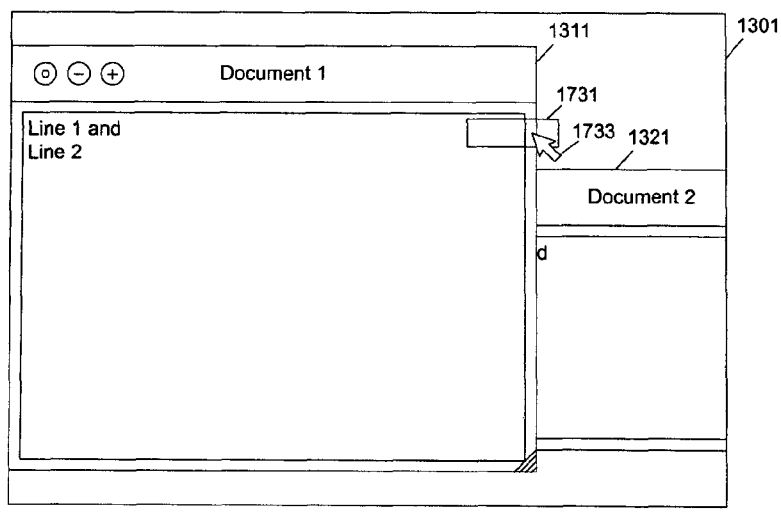
Figure 18:
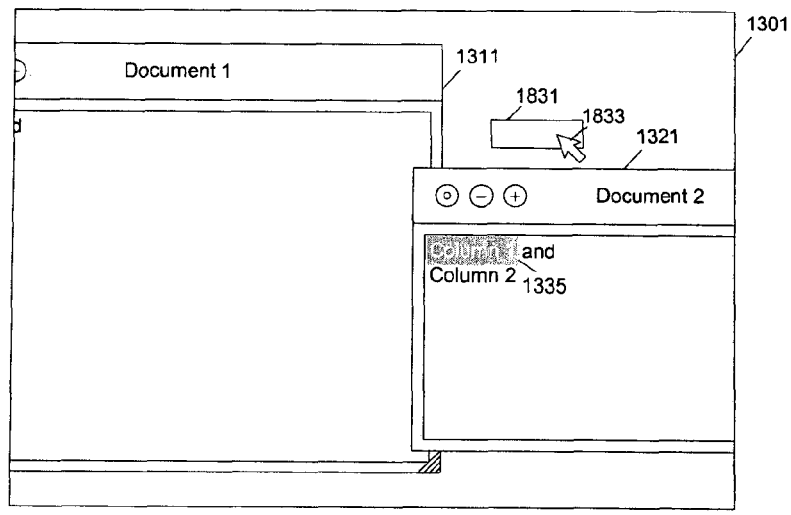

In one scenario, when the user drags the item to the border of window 1311, as indicated by outline 1731 and cursor 1733 in FIG. 17, window 1311 remains fully accessible. Window 1311 accepts the dragged item in a default manner where the location in the window 1311 will be automatically determined. However, the border of window 1311 does not accept the dragged item. Thus, window 1311 in FIG. 17 does not show a cursor to indicate a destination dropping location. If the user further drags the item outside window 1311, as indicated by outline 1831 and cursor 1833 in FIG. 18, window 1311 returns to the original position on the screen (such that it is off screen partially) and to the original position in the window hierarchy, in which window 1311 was before the item is dragged into window 1311.

While FIGS. 13-18 illustrate scenarios for dragging of information between windows of one or more application programs (such as one or more word processing or text editing programs), the scenarios of these figures also apply to dragging of iconic representations of files or folders between overlapping windows in a file management system, such as the "Finder" on Macintosh Operating Systems. For example, item 1335 may be an iconic representation of a file or folder within a window ("source window") which is dragged to another window ("target window") which is partially obscured by the window or other windows (or is off screen). In this case, the source and target windows are typically representing opened folders in a file directory system of an operating system and thus display files and folders (e.g., subdirectories) within each window.

Also, while FIGS. 13-18 illustrate scenarios in which the window, which is the source of the item being dragged, is over and hence obscuring the target window which receives the item being dragged, it will be understood that the scenarios of these figures also apply to situations in which the source window does not obscure or overlap the target window but at least one other window overlaps and obscures the target window. In this situation, a dragging of an item from the source window to a target window will cause the target window to appear front most relative to the windows which had covered it prior to receiving the dragged item.

In the scenarios of FIGS. 13-18, a delay period (e.g., a short period of time) may be used in a preferred embodiment to determine that a change in window layout hierarchy should occur in response to the dragging of an item. This is a desirable feature since without this feature, background windows would spring to become foreground windows whenever a dragged item appears in an area of the window, and the resulting springing forward of background windows would be distracting and possibly disorienting to a user (and would require additionally processing effort on the part of the data processing system which would be required to spring the background windows forward). In one exemplary embodiment, this delay period is a predetermined period of time which is used to determine how long a cursor remains in a location (or two-dimensional region) of a display. If the cursor, during a drag, remains in a region of background window for more than the predetermined period of time, then the background window becomes a foreground window allowing access to obscured area of the window. Alternatively, a threshold dragging velocity (e.g., a movement of a dragged item across the screen at or less than a certain velocity) may be used to determine that a user wishes to bring a background window forward whenever the velocity of a dragged item over a background window is less than the threshold dragging velocity. Another alternative may use a keyboard command (e.g., pressing the space bar) while dragging an item to an obscured background window to indicate that the background window should be brought forward so that it is not obscured. It will also be appreciated that a combination of these features may be used to signal when a background window should be brought forward.

Figure 19:
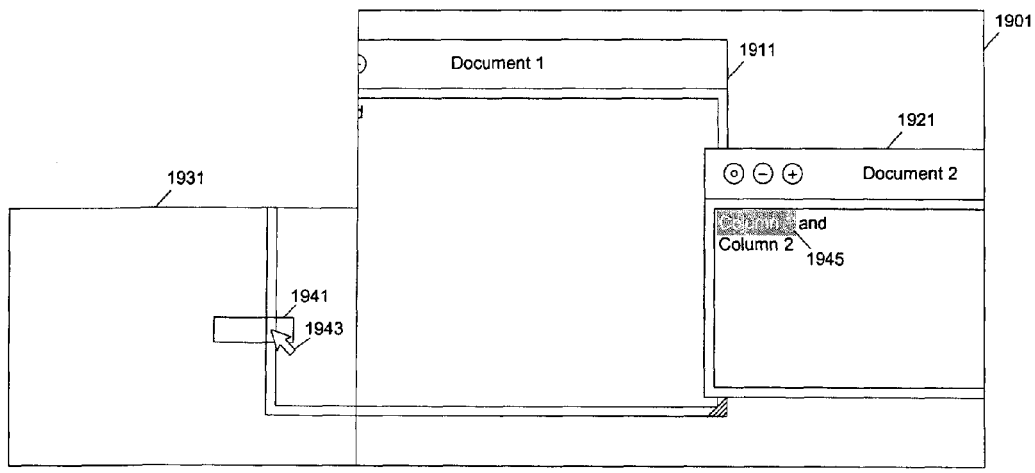
FIGS. 19-22 illustrate scenarios for dragging an item to a spring-loaded window on a multi-screen display system according to one embodiment of the present invention.
Figure 20:
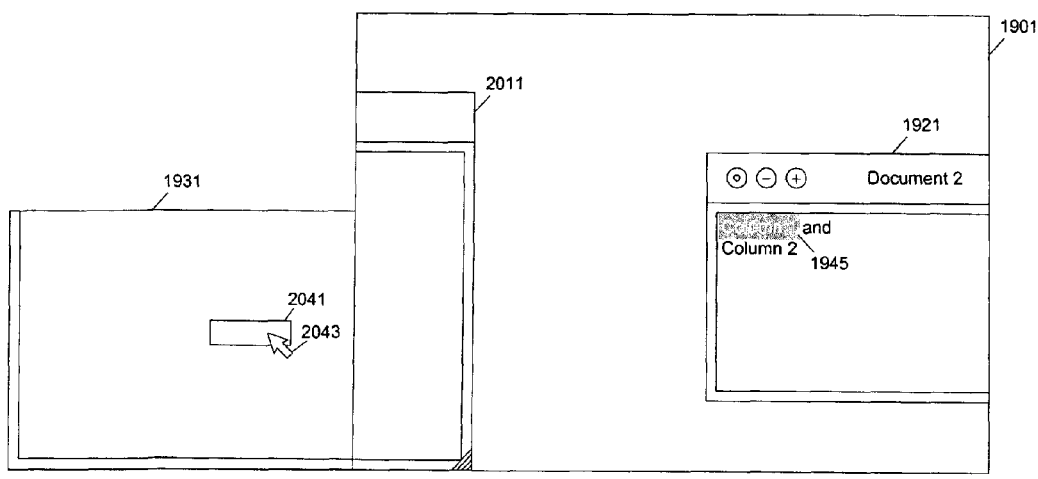
Figure 21:
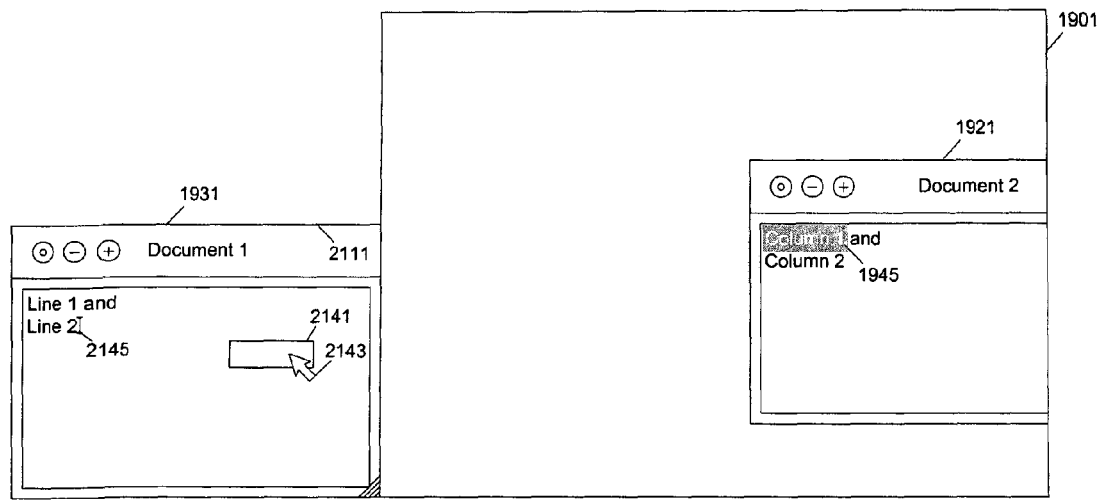

FIGS. 19-22 illustrate scenarios for dragging an item to a spring-loaded window on a multi-screen display system according to one embodiment of the present invention. In FIG. 19, window 1911 is partially displayed on screen 1901 and partially displayed on screen 1931. Selected item 1945 is dragged from window 1921. When the dragged item is paused on the border of window 1911 on screen 1931, as indicated by outline 1941 and cursor 1943 in FIG. 19, window 1911 is slid toward screen 1931 to a position as shown in FIG. 20. However, the system determines that window 2011 is too large to be displayed entirely on screen 1931, and as a result of that determination the size of window 2011 is automatically reduced to that of window 2111 as shown in FIG. 21. After the operations of sliding on screen and reducing in size, window 2111 is completely accessible on screen 1931. Thus, the user can see cursor 2145 where window 2111 will accept the item if the item is dropped at the location indicated by outline 2141 and cursor 2143.

Figure 22:
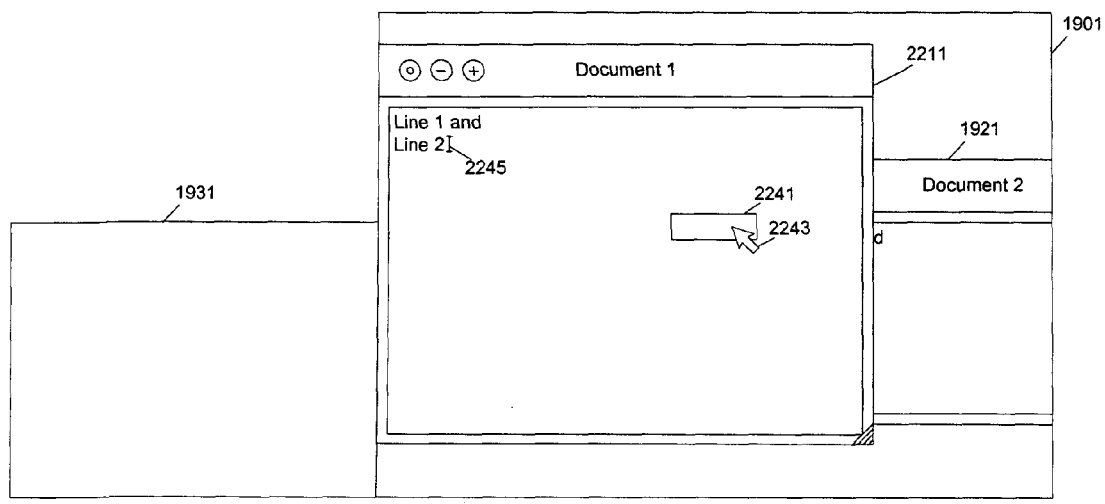

In another scenario, when the item is dragged and paused over the portion of window 1911 that is in screen 1901, window 1911 is brought forward in the window layout hierarchy and moved toward screen 1901 to a position as indicated by window 2211 in FIG. 22. Thus, window 2211 is completely accessible on screen 1901. Window 2211 displays cursor 2245 to indicate the destination position for accepting the dragged item if the dragged item is dropped at the location indicated by outline 2241 and cursor 2243.

If the user indicates that the destination is not in window 2111 in FIG. 21 (or window 2211 in FIG. 22) (e.g., by pressing a short-cut key, such as the Esc key, or by dragging the item outside the window), the window goes back where it was before the item is dragged into the window (e.g., the position of window 1911 in FIG. 19)

While FIGS. 19-22 show scenarios for dragging of information between windows of one or more application programs (such as one or more word processing or text editing programs or other programs), the scenarios of these figures also apply to dragging of iconic representations of files or folders between overlapping windows in a file management system. For example, item 1945 may be an iconic representation of a file or folder within a window ("source" window) which is dragged to another window ("target" window) which is partially obscured by the window or other windows or is off screen.

In the scenarios of FIGS. 19-22, a delay period or a threshold dragging velocity or a keyboard command or some other input may be used to determine that a change in window layout hierarchy (e.g., a change in the position of the window on the screen of a display device) should occur in response to the dragging of an item.

It is understood that the operation of sliding on the screen (or a jumping without a slide), the operation of changing in window hierarchy, and the operation of resizing can be performed in various different sequences, or be combined. Animation effects can also be used to provide feedback to the user as how the window is slid on the screen, moved in the window layout hierarchy, or resized.

Figure 23:
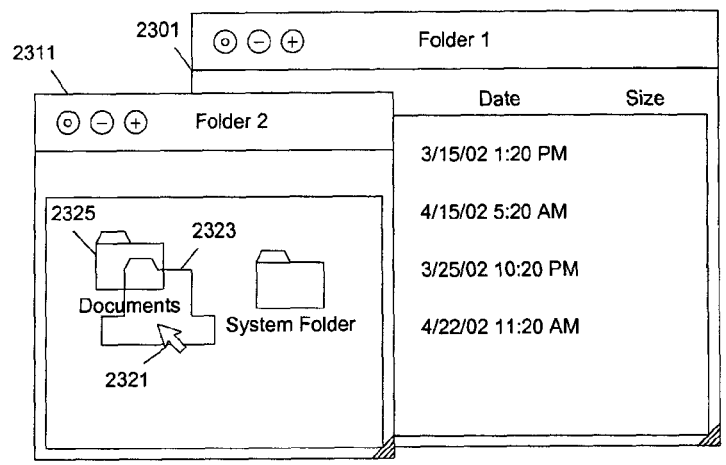
FIGS. 23-28 illustrate scenarios for dragging an item to a spring-loaded folder in a spring-loaded window according to one embodiment of the present invention.
Figure 24:
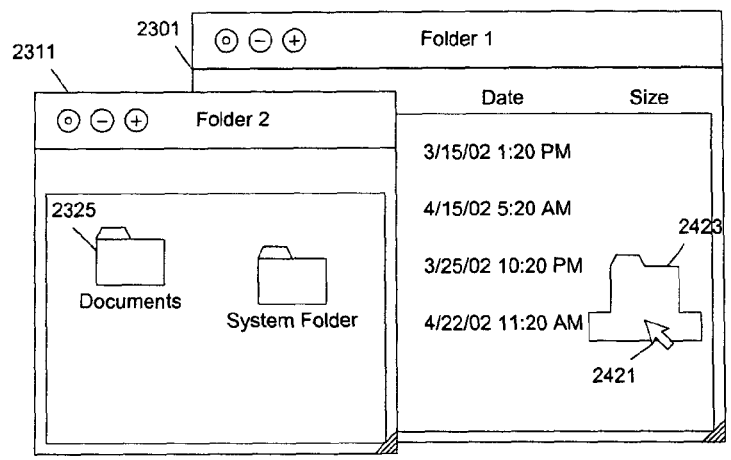
Figure 25:
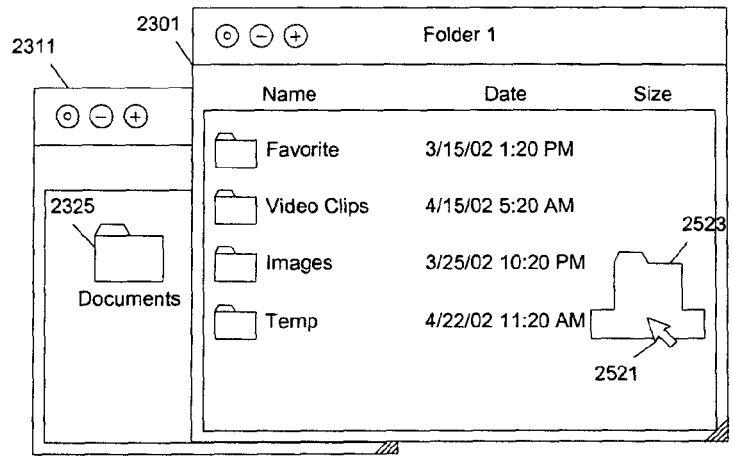
Figure 26:
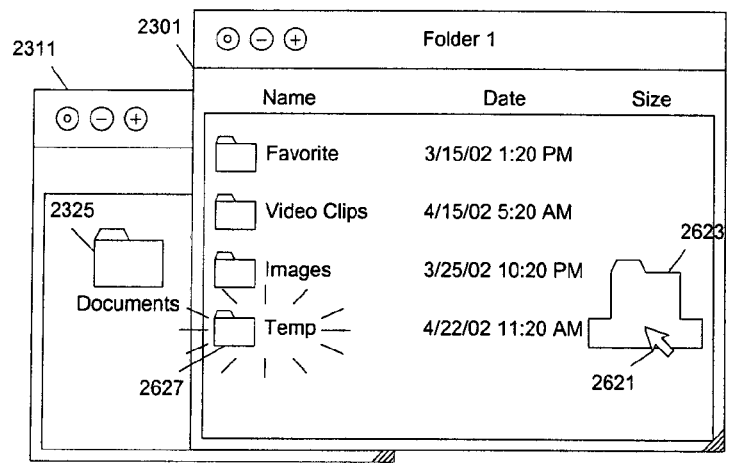
Figure 27:
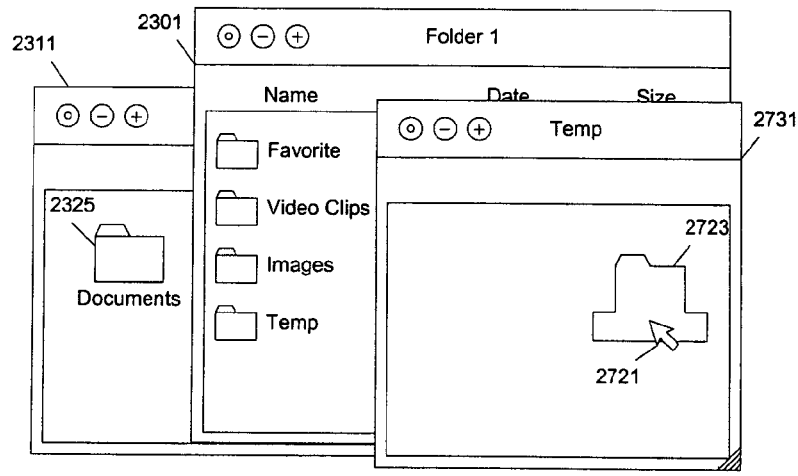

FIGS. 23-28 illustrate scenarios for dragging an item to a spring-loaded folder in a spring-loaded window according to one embodiment of the present invention. In FIG. 23, window 2301 is partially inaccessible, as it is covered by window 2311. Outline 2323 indicates that selected item 2325 is dragged by cursor 2321. When the item is dragged to a position indicated by outline 2423 and cursor 2421 shown in FIG. 24, the dragged item is over a spring-loaded folder in window 2301. Note that a closed folder does not display contents in an opened window and thus a closed folder is not like an opened window in this sense. However, the icon for the spring-loaded folder is not visible when window 2301 is at the position as shown in FIG. 24. After the dragged item is paused above the spring-loaded folder for a short time (e.g., hovered near the region of the folder of the drag velocity is below a threshold in this region), window 2301 is brought forward in the window layout hierarchy to make the entire window visible, as shown in FIG. 25. Since the dragged item is above the spring-loaded folder, folder 2627 blinks, as shown in FIG. 26, to indicate that folder 2627 is ready to be opened. After folder 2627 blinks visibly for a short period of time, while the dragged item is still over folder 2627 as indicated by outline 2623 and cursor 2621, a new window, such as window 2731 in FIG. 27, is opened for the spring-loaded folder. Since the spring-loaded folder preferably (but optionally) blinks visibly for a short period of time (or provides some other feedback), the problem of mistakenly opening a spring-loaded folder because a spring-loaded window is blinking invisibly under another window (or off the screen) is avoided. In FIG. 27, window 2301 remains on top of window 2311 after spring-loaded folder 2731 is opened. In an alternative embodiment of the present invention, window 2301 returns to the previous state (e.g., displayed partially under window 2311, as in FIG. 23) when spring-loaded folder 2731 is opened.

In FIG. 27, if the dragged item is dropped within window 2731, folder 2325 is moved into window 2731 after dropping the item. If the user drags the item outside window 2731, such as to a position as indicated by outline 2823 and cursor 2821 in FIG. 28, window 2731 for the spring-loaded folder is closed automatically. Then, the user may select a destination location for dropping the dragged item in a desired location in window 2301.

Figure 28:
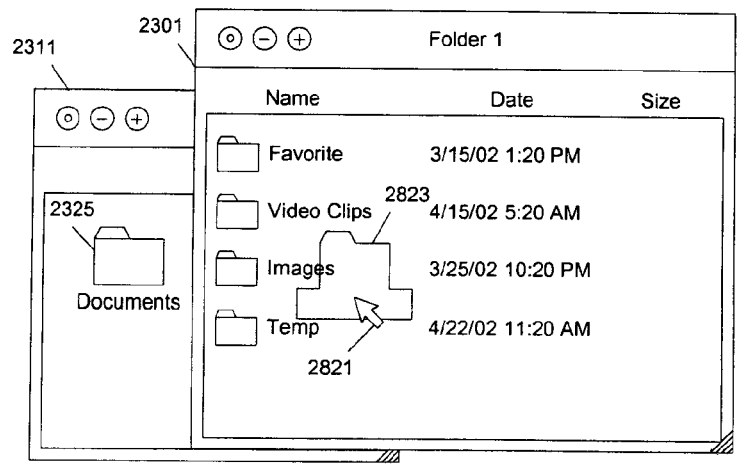

In FIG. 26, if the user sees the blinking folder 2627 and decides that the destination location is not in the spring-loaded folder 2627, the user can drag the item to another location, such as the position in FIG. 28, to avoid opening the spring-loaded folder.

It is understood that once a window is made completely accessible (visible) on a screen, various known techniques for navigating the dragged item can be also be used to select a desired destination location. For example, an auto-scroll system can be used to scroll the window by dragging the item to a predefined location within the window (e.g., near (or on) the border of the window, or near (or on) the scroll bar in the window; an example of such a system is described in U.S. Pat. No. 5,196,838); a spring-loaded folder can be opened by pausing the dragged item above the spring-loaded folder.

Although FIG. 27 shows a method where a new window is opened for a spring-loaded folder, the spring-loaded folder may be opened within window 2301, where the contents of the folder that contains the spring-loaded folder are replaced with the contents of the spring-loaded folder in a different embodiment.

In the scenarios illustrated in FIGS. 23-28, a delay period or a threshold dragging velocity or a keyboard command or some other input may be used to determine that a change in window layout hierarchy should occur in response to the dragging of an item. While FIGS. 23-28 show examples where the source window for the drag operation obscures the target window, it will appreciated that these examples (of embodiments depicted in FIGS. 23-28) also apply to situations in which one or more windows other than the source window obscures the target window or to situations in which the target window is partially off screen (and hence not completely accessible).

While the examples shown in FIGS. 23-28 relate to dragging operations in which a file or a folder is dragged between windows in a file management system which may be considered part of an operating system, it will be appreciated that these examples may also apply to dragging operations between a file system window (containing iconic representation of files and/or folders, wherein the folders represent subdirectories in the file management system) and a window for an application program, which is not a file management system program such as word processing (e.g., Microsoft's Word) or spreadsheet (e.g., Microsoft's Excel) or drawing (e.g., Microsoft's Visio) or presentation (e.g., Microsoft's PowerPoint) or database or email or web browser computer programs or other non-operating system computer programs. For example, data from an application program (e.g., a portion of text or a drawing) may be dragged from the window controlled by the application program to a partially viewable window, controlled by the file management system, which displays files and/or folders, such as a spring loaded folder. The dropping of the data from the application program's window creates a file which is "dropped" into the window of the file management system (which in turn is organized into the file directory of the file management system based upon where the file was dropped). As another example, a file from a window controlled by the file management system may be dragged from this window to a partially viewable window, controlled by an application program (e.g., an email program) and as a result of this dragging, the partially viewable window becomes more accessible (e.g. it becomes the front most window or it slides from being partially off-screen to being less partially off screen or completely on screen), and this allows the user to drop the file in some location within the window controlled by the application program (e.g., the email program).

FIGS. 33-36 illustrate a scenario for dragging an item to a spring-loaded window obscured by a menu region according to one embodiment of the present invention. In some graphical user interface systems, a menu region (e.g., a task bar, a launch pad, a menu bar, a tool bar, a dock, and other windows) is configured, or can be configured by a user, to be always at a certain level in a window layout hierarchy (e.g., above all windows, or above a group of windows, or above some types of windows) so that some windows cannot be brought forward to obscure the menu region. It is understood that in this application, a menu region refers to a window that is configured to be at a level in a window layout hierarchy so that some or all of other windows cannot obscure the menu region, even through in some implementations the menu region may not have a conventional menu button or menu bar. Such a menu region typically, but not always, has a region to contain icons for minimized windows, or icons or buttons for launching application programs, or status information, or menu buttons, or other buttons. A menu region is typically, but not always, docked at one of the edges of the display screen.

Figure 33:
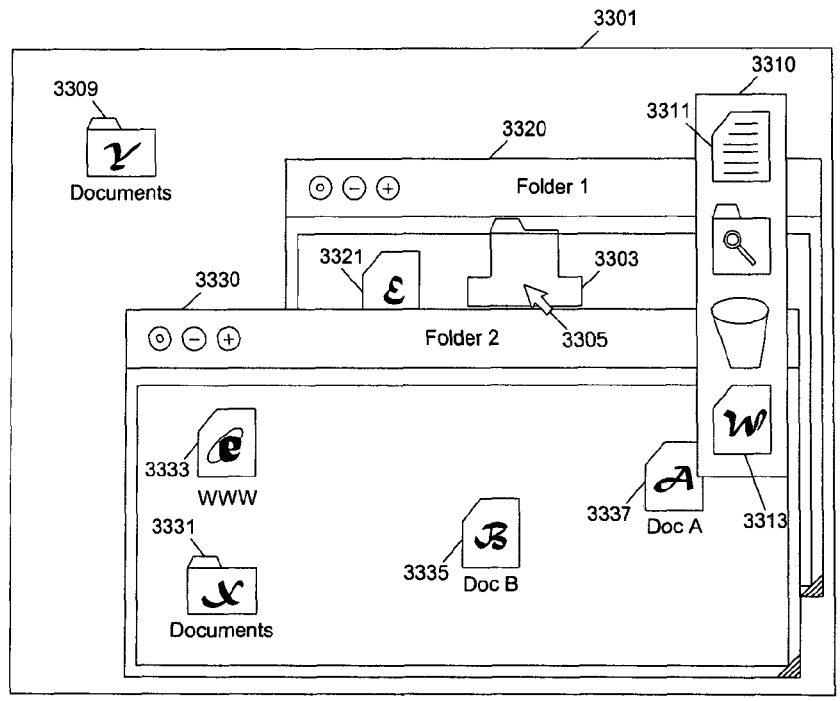
FIGS. 33-36 illustrate a scenario for dragging an item to a spring-loaded window obscured by a menu region according to one embodiment of the present invention.
Figure 34:
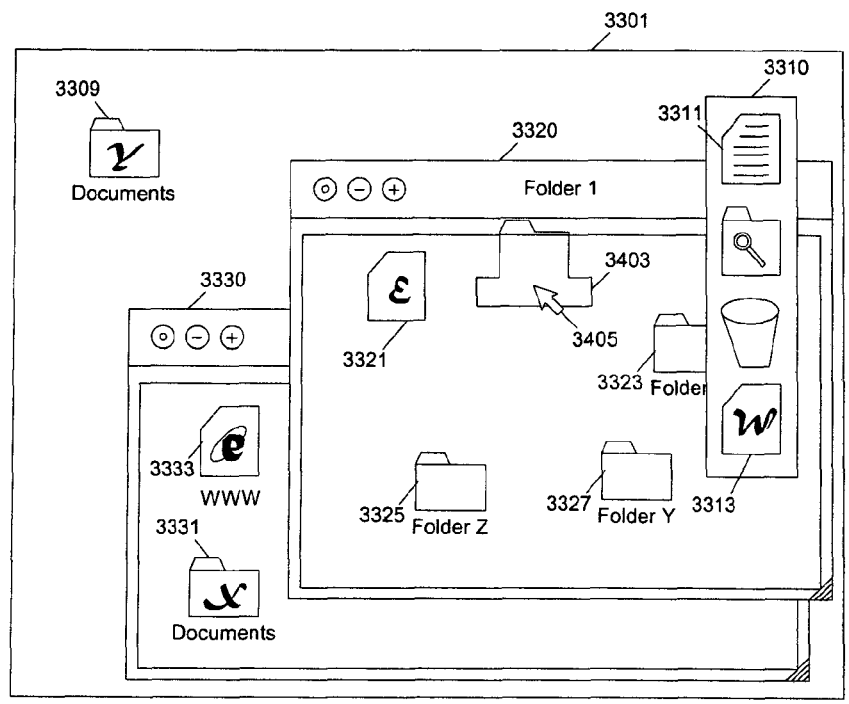
Figure 35:
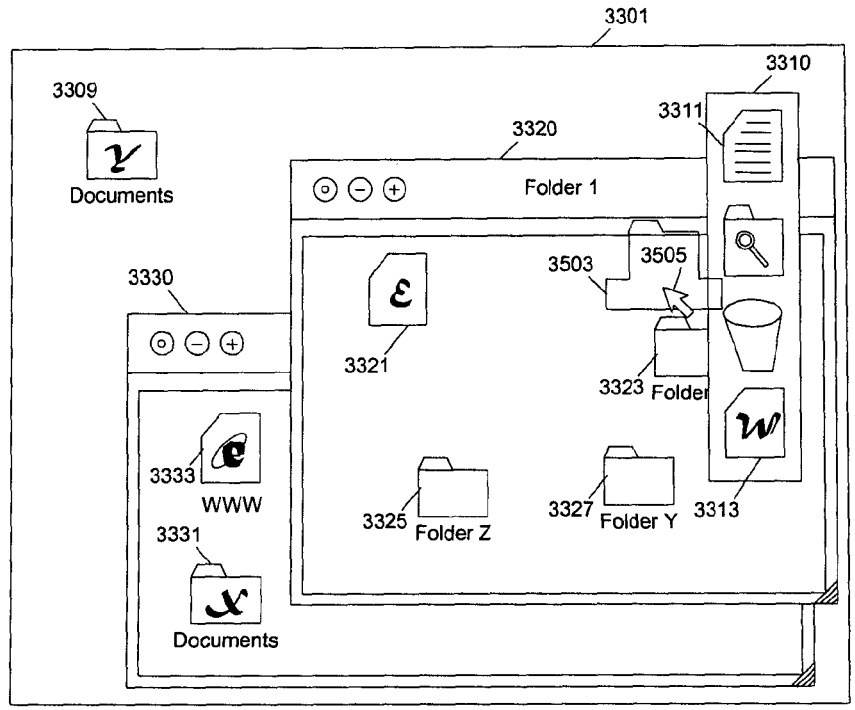
Figure 36:
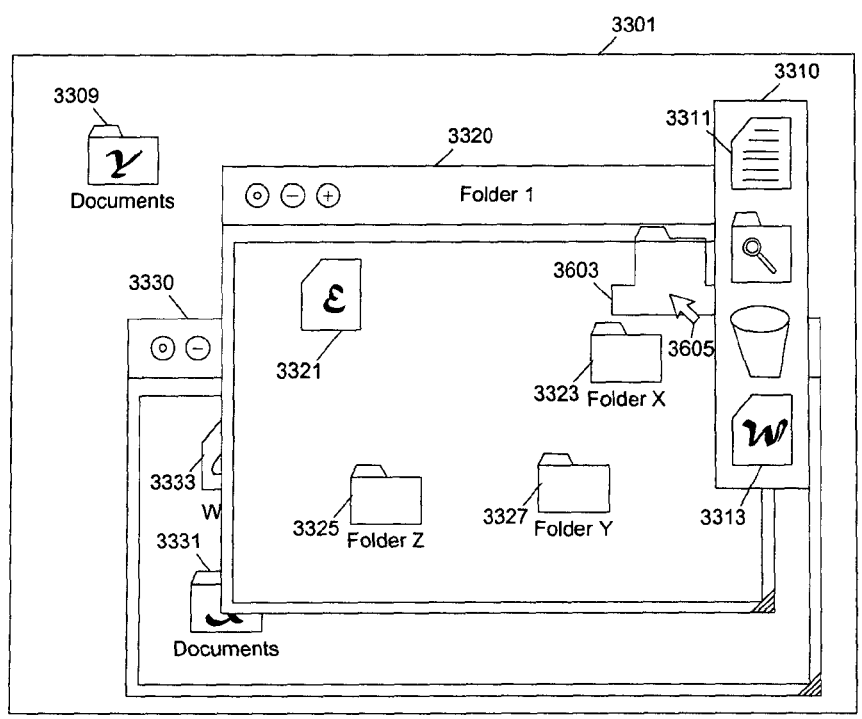

For example, menu region 3310 in FIGS. 33-36 is configured to be on a level (e.g., the top level) in the window layout hierarchy so that windows 3320 and 3330 cannot be brought forward to obscure menu region 3310. Menu region 3310 contains icon 3311 representing a minimized window (e.g., a window for a word processing application) and icon 3313 representing a software application program (e.g., a word processing application). In FIG. 33, cursor 3305 and outline feedback 3303 indicate that an item (e.g., item 3331 in window 3330, or item 3309 on a desktop environment on screen 3301) is dragged into window 3320. Window 3320 is partially obscured by window 3330 and partially obscured by menu region 3310. After a determination that window 3320 is a target window (e.g., when cursor 3305 is in window 3320 continuously for a certain amount of time, or when a speed of dragging is slower than a threshold while the cursor 3305 is in window 3303, or when a key, such as the space key, is pressed, or when other indications are received), a change in window layout hierarchy is made to display window 3320 above window 3330 so that window 3320 becomes more accessible, as shown in FIG. 34. In one embodiment, it is determined that the window 3330 is obscuring a target region in window 3320; and, the window hierarchy is changed so that window 3330 cannot obscure window 3320 (e.g., by bringing window 3320 to a level above the level of window 3330 in the window layout hierarchy, or by sending window 3330 to a level below the level of window 3320). In one embodiment, it is determined that window 3330 is obscuring a target region in window 3320 when outline feedback 3303 and cursor is close or partially overlapping with window 3330. In FIG. 34, window 3320 is still partially obscured by menu region 3311. When the cursor and the outline feedback are moved close to the menu region, as shown in FIG. 35, outline feedback 3503 is partially overlapping with menu region 3310. In FIG. 35, cursor 3505 is still in window 3320 (e.g., indicated by the position of the center of cursor 3505), while window 3320 is partially obscured by menu region 3310. Thus, when it is determined the target region in window 3503 is obscured (e.g., when the item is dragged near a region as shown in FIG. 35 for a certain amount of time, or when a short-cut key is pressed, or when a dragging speed smaller than a threshold value is detected), the layout of the windows is changed to display at least a portion of the obscured region. For example, window 3320 is repositioned from the location as shown in FIG. 35 to a position as shown in FIG. 36. Since menu region 3310 is configured to be at a level above window 3320, window 3320 cannot be brought in front of menu region 3310; however, window 3320 can be repositioned (and/or resized) to reveal at least a portion of the region obscured by menu region 3310.

Figure 29:
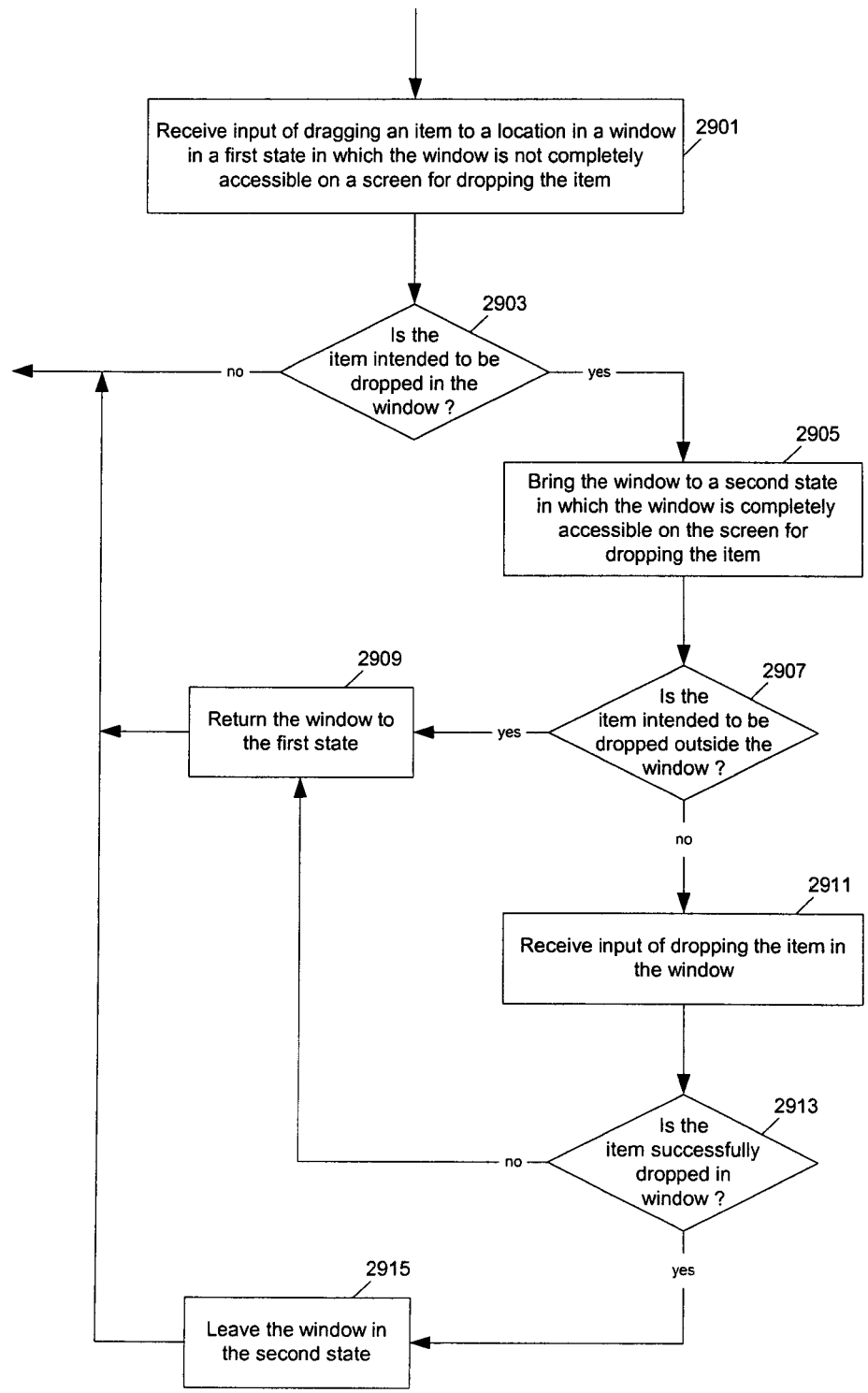
FIG. 29 shows a method to manipulate a window for dropping a dragged item according to one embodiment of the present invention.

FIG. 29 shows a method to manipulate a window for dropping a dragged item according to one embodiment of the present invention. Operation 2901 receives input which indicates a dragging of an item to a location in a window. The window is in a first state in which the window is not completely accessible on a display screen for dropping the item (e.g., partially covered by another window, partially off the screen, or partially on another screen, such as window 1911 in FIG. 19) but it is partially viewable in that some of the area defined by the window's borders are viewable such that at least some of the contents of the window are viewable (it is noted here that the title bar or a window tab or a window's border is not considered part of the contents within the area as these items, such as a title bar or a window tab (e.g., see the tabs of U.S. Pat. No. 5,305,435), are not within a user controllable area defined by a border of the window. Thus, in the context of the terms "partially accessible" or partially viewable" which are used herein, the contents of a window, when only the title bar or a window tab or a border is present on display screen, are not considered partially accessible or partially viewable. If it is determined that the item is intended to be dropped in the window in operation 2903, operation 2905 brings the window to a second state in which the window is completely accessible (or at least more accessible) on the screen for dropping the item. If it is later determined that the item is intended to be dropped outside the window in operation 2907, operation 2909 returns the window to the first state, where the window is partially inaccessible (e.g., partially off screen or partially obscured by another window); otherwise, after operation 2911 receives input of dropping the item in the window, it is determined whether or not the item is successfully dropped in the window in operation 2913. The item is successfully dropped in the window if the data communication represented by the drag-and-drop operation is performed successfully (e.g., the item is successfully copied, or moved). If the dropping is successful, operation 2915 leaves the window in the second state; otherwise, the window is returned to the first state in operation 2909.

Figure 30:
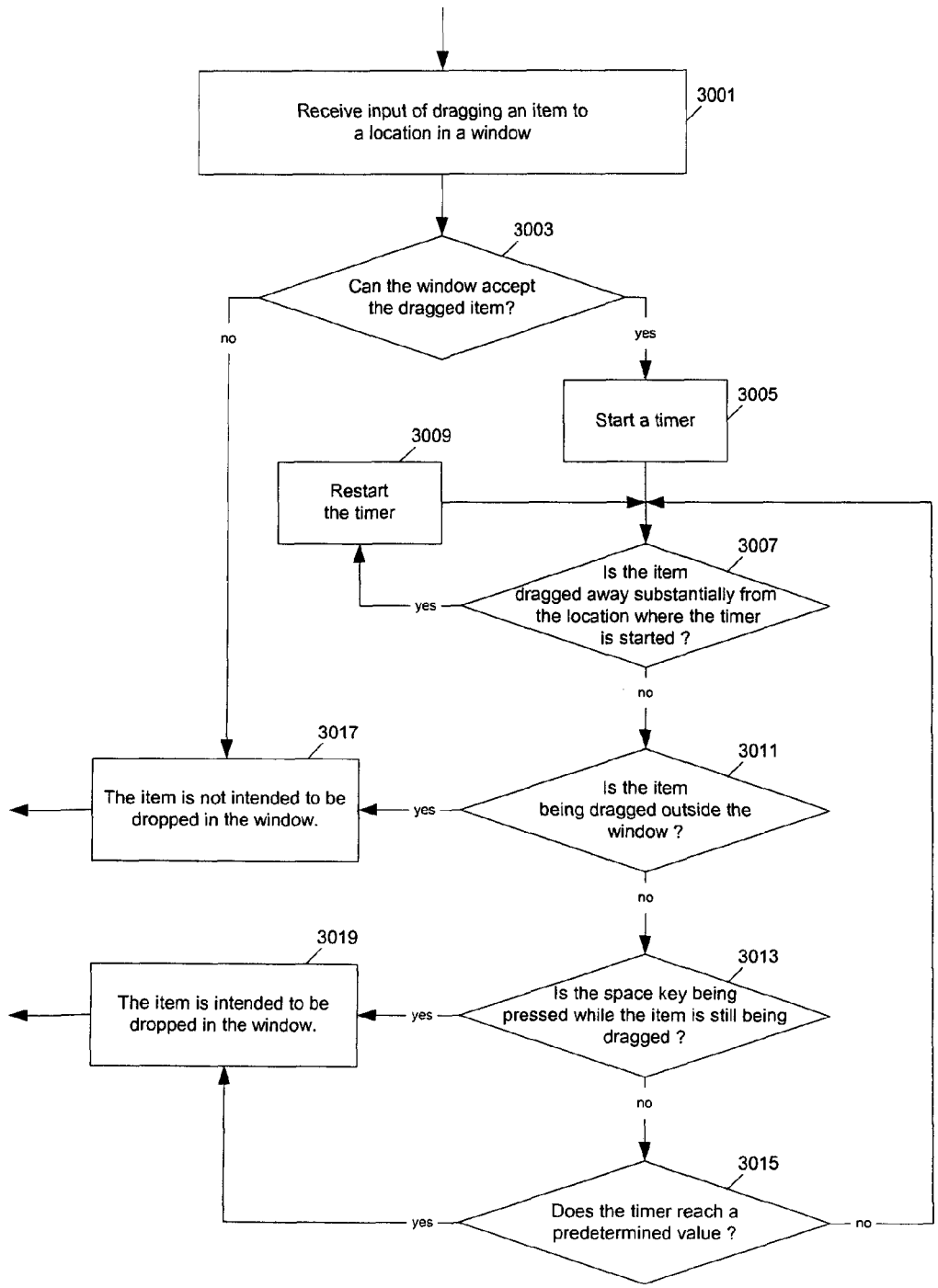
FIG. 30 shows a method to determine whether or not a dragged item is intended to be dropped in a window according to one embodiment of the present invention.

FIG. 30 shows a method to determine whether or not a dragged item is intended to be dropped in a window according to one embodiment of the present invention. Methods which use a different approach (e.g., measuring a drag velocity) may also be used in other embodiments. Such a method can be performed for operation 2903 in FIG. 29. After operation 3001 receives input of dragging an item to a location in a window, it is determined whether or not the window can accept the dragged item in operation 3003. If the dragged item cannot be accepted by the window, it is concluded that the item is not intended to be dropped in the window in operation 3017; otherwise, operation 3005 starts a timer. If operation 3007 determines that the item is dragged away substantially from the location where the timer is started (e.g., the sum of horizontal and vertical movement is more than a predetermined amount), the timer is restarted in operation 3009; otherwise, operation 3011 is performed. If operation 3011 determines that the item is dragged outside the window, the item is not intended to be dropped in the window; otherwise, operation 3013 is performed. If operation 3013 determines that a short-cut key (e.g., a space key) is pressed while the item is still being dragged, it is concluded that the item is intended to be dropped in the window in operation 3019; otherwise, operation 3015 is performed to determine whether or not the timer reaches a predetermined value. If the timer reaches a predetermined value, it is determined that the dragged item is paused at or hovers above the location for a predetermined amount of time so that the item is intended to be dropped in the window; otherwise, operation 3007 is repeated.

Figure 31:
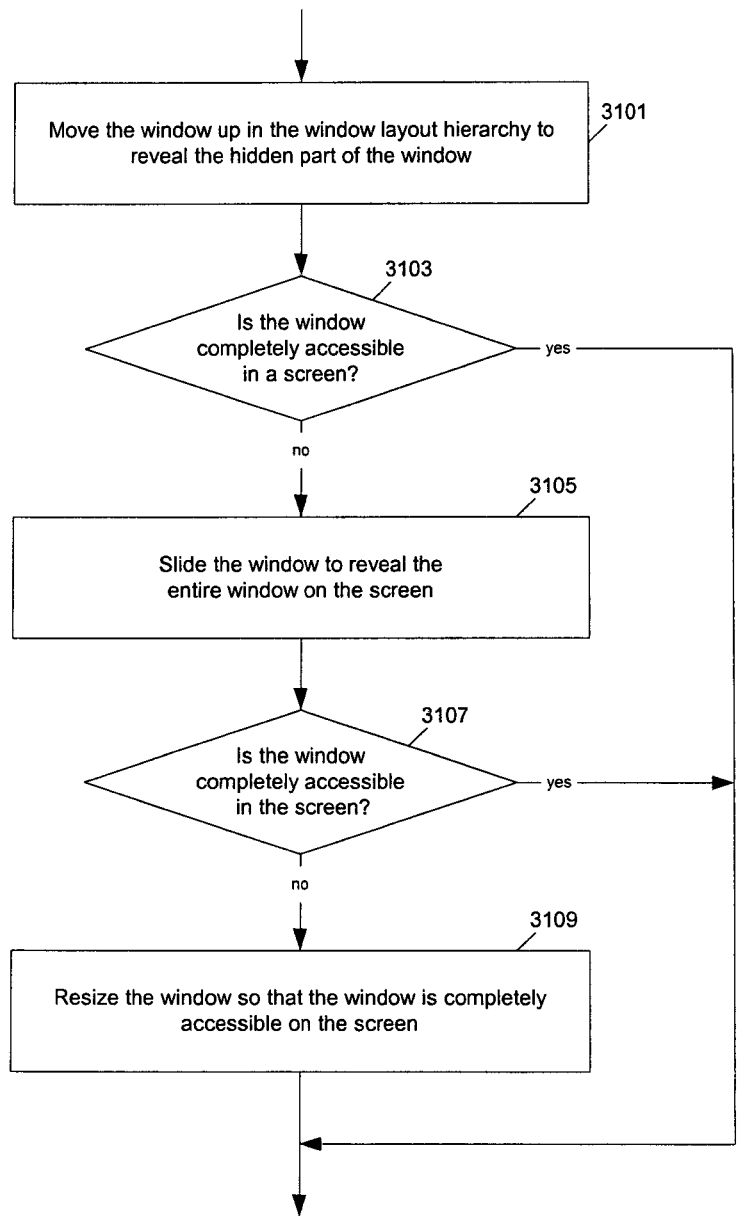
FIG. 31 shows a method to bring a window to a state in which the window is completely accessible on a screen for dropping a dragged item according to one embodiment of the present invention.

FIG. 31 shows a method to bring a window to a state in which the window is completely accessible (or at least more accessible) on a screen for dropping a dragged item according to one embodiment of the present invention. Such a method can be performed for operation 2905 in FIG. 29. Operation 3101 moves the window up in the window layout hierarchy to reveal the hidden part of the window. If operation 3103 determines the window is not completely accessible because it is partially off screen, operation 3105 slides the window on the screen to reveal the entire window (or at least more of the window) on the screen. If operation 3107 further determines the window is not completely accessible (if it is intended to make the window completely accessible), operation 3109 resizes the window so that the window is completely accessible on the screen.

Figure 32:
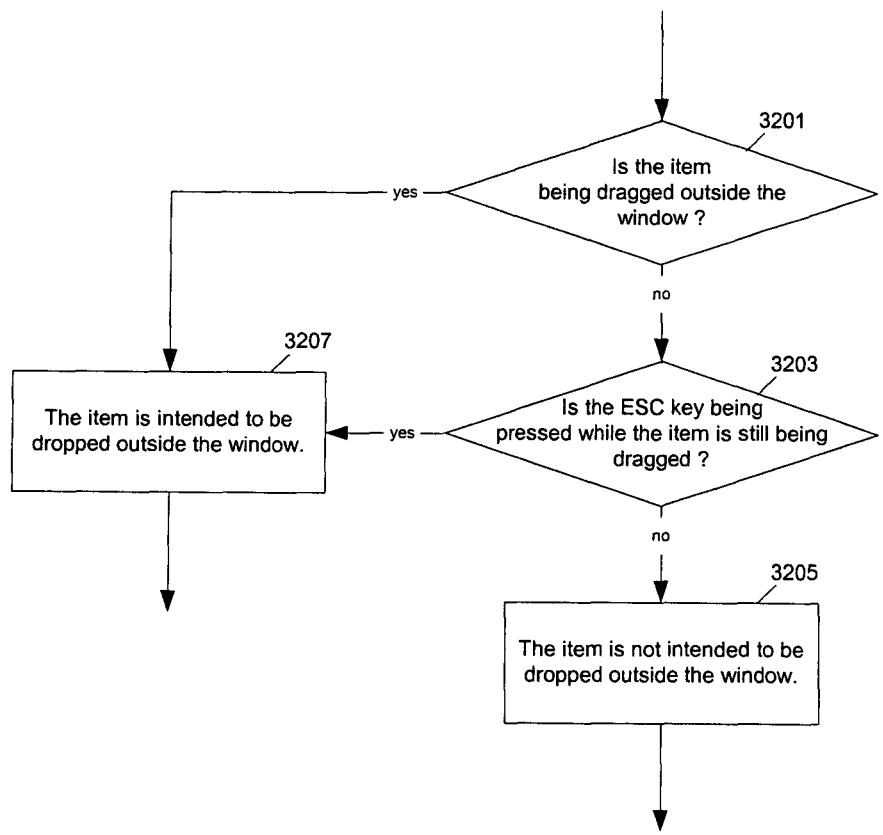
FIG. 32 shows a method to determine whether or not a dragged item is intended to be dropped outside a window according to one embodiment of the present invention.

FIG. 32 shows a method to determine whether or not a dragged item is intended to be dropped outside a window according to one embodiment of the present invention. Such a method can be performed for operation 2907 in FIG. 29. If operation 3201 determines that the item is dragged outside the window, it is concluded that the item is intended to be dropped outside the window in operation 3207; otherwise, if operation 3203 determines a short-cut key (e.g., the Esc Key) is pressed while the item is still being dragged, the item is intended to be dropped outside the window; otherwise, the item is not intended to be dropped outside the window.

The embodiments of the present invention may be used with windows which are translucent (e.g., windows which allow underlining windows to be somewhat visible).

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method to manipulate a window in a digital processing system, the method comprising:

receiving an input for an item in a first window wherein the input shows a positioning of the item over an area of the first window, the first window being in a first state;

determining whether the item is intended to be dropped in the first window;

determining whether the first window is partially off-screen on a first screen, if the item is intended to be dropped in the first window;

automatically bringing the first window to a second state in which the first window is more accessible on the first screen that comprises repositioning the first window in the first screen to reveal a second portion of the first window that is off-screen in the first state if it is determined that the first window is partially off-screen, and returning the first window from the second state to the first state if the item is not dropped in the first window that includes repositioning the second portion of the first window on the first screen back off-screen to the original position of the first window in the first state.

2. A method as in claim 1 further comprising:
determining whether or not the first window contains a target location for the item;
wherein the first window is brought to the second state in response to a first determination that the first window contains a target location for the item; and, wherein said bringing the first window to the second state is in response to the input and before the item is dropped.

3. A method as in claim 2 wherein the first determination is in response to a predetermined input, the predetermined input comprising one of:
  a) a determination that the item has hovered around a location in the first window for a predetermined amount of time; and
  b) an input of pressing a key while the item is being dragged in the first window.

4. A method as in claim 1 wherein the returning the first window from the second state to the first state is in response to a second determination that the first window does not contain a target location for the item.

5. A method as in claim 4 wherein the second determination is in response to a predetermined input, the predetermined input comprising one of:
  a) an input of pressing a key while the item is being dragged in the first window; and
  b) an input of dragging the item outside the first window.

6. A method as in claim 1 further comprising:
receiving input of dropping the item in the first window; and
returning the first window from the second state to the first state in response to a failure in an operation associated with dropping the item.

7. A method as in claim 1 wherein said bringing the first window to the second state comprises:
changing a window layout hierarchy for the first window to reveal a first portion of the first window, the first portion being covered by a second window on the first screen when the first window is in the first state, and the second portion being displayed on top of the second window when the first window is in the second state.

8. A method as in claim 1 wherein when the first window is in the first state the second portion of the first window is one of:
  a) located outside the first screen;
  b) displayed on a second screen; and
  c) covered by a third window on the first screen.

9. A method as in claim 1 wherein said bringing the first window to the second state comprises:
resizing the first window in the first screen to reveal a third portion of the first window, the third portion of the first window being invisible on the first screen when the first window is in the first state.

10. A method as in claim 9 wherein when the first window is in the first state the third portion of the first window is one of:
  a) located outside the first screen;
  b) displayed on a second screen; and
  c) covered by a third window on the first screen.

11. A non-transitory machine readable medium storing executable computer program instructions which when executed by a digital processing system cause said system to perform a method to manipulate a window in the digital processing system, the method comprising:
receiving an input for an item in a first window, the first window being in a first state;
determining whether the item is intended to be dropped in the first window;
determining whether the first window is partially off-screen on a first screen, if the item is intended to be dropped in the first window;
automatically bringing the first window to a second state in which the first window is more accessible on the first screen, wherein said bringing the first window to the second state comprises repositioning the first window in the first screen to reveal a second portion of the first window that is off-screen in the first state if it is determined that the first window is partially off-screen, and
returning the first window from the second state to the first state if the item is not dropped in the first window that includes repositioning the second portion of the first window on the first screen back off-screen to the original position of the first window in the first state.

12. A non-transitory medium as in claim 11 wherein the method further comprises:
determining whether or not the first window contains a target location for the item;
wherein the first window is brought to the second state in response to a first determination that the first window contains a target location for the item; and, wherein said bringing the first window to the second state is in response to the input and before the item is dropped.

13. A non-transitory medium as in claim 12 wherein the first determination is in response to a predetermined input, the predetermined input comprising one of:
  a) a determination that the item has hovered around a location in the first window for a predetermined amount of time; and
  b) an input of pressing a key while the item is being dragged in the first window.

14. A non-transitory medium as in claim 11 wherein the returning the first window from the second state to the first state is in response to a second determination that the first window does not contain a target location for the item.

15. A non-transitory medium as in claim 14 wherein the second determination is in response to a predetermined input, the predetermined input comprising one of:
  a) an input of pressing a key while the item is being dragged in the first window; and
  b) an input of dragging the item outside the first window.

16. A non-transitory medium as in claim 11 wherein the method further comprises:
receiving input of dropping the item in the first window; and
returning the first window from the second state to the first state in response to a failure in an operation associated with dropping the item.

17. A non-transitory medium as in claim 11 wherein said bringing the first window to the second state comprises:
changing a window layout hierarchy for the first window to reveal a first portion of the first window, the first portion being covered by a second window on the first screen when the first window is in the first state, and the second portion being displayed on top of the second window when the first window is in the second state.

18. A non-transitory medium as in claim 11 wherein when the first window is in the first state the second portion of the first window is one of:
  a) located outside the first screen;

b) displayed on a second screen; and c) covered by a third window on the first screen.

19. A non-transitory medium as in claim 11 wherein said bringing the first window to the second state comprises:

resizing the first window in the first screen to reveal a third portion of the first window, the third portion of the first window being invisible on the first screen when the first window is in the first state.

20. A non-transitory medium as in claim 19 wherein when the first window is in the first state the third portion of the first window is one of:

a) located outside the first screen;

b) displayed on a second screen; and c) covered by a third window on the first screen.

21. A digital processing system to manipulate a window of a user interface, the digital processing system comprising:

means for receiving an input for an item in a first window, the first window being in a first state;

means for determining whether the item is intended to be dropped in the first window;

determining whether the first window is partially off-screen on a first screen, if the item is intended to be dropped in the first window;

means for automatically bringing the first window to a second state in which the first window is more accessible on the first screen, wherein said means for bringing the first window to the second state comprises means for repositioning the first window in the first screen to reveal a second portion of the first window that is off-screen in the first state if it is determined that the first window is partially off-screen, and means for returning the first window from the second state to the first state if the item is not dropped in the first window that includes repositioning the second portion of the first window on the first screen back off-screen to the original position of the first window in the first state.

22. A digital processing system as in claim 21 further comprising:

means for determining whether or not the first window contains a target location for the item;

wherein the first window is brought to the second state in response to a first determination that the first window contains a target location for the item; and, wherein the first window is brought to the second state in response to the input and before the item is dropped.

23. A digital processing system as in claim 22 wherein the first determination is in response to a predetermined input, the predetermined input comprising one of:

a) a determination that the item has hovered around a location in the first window for a predetermined amount of time; and b) an input of pressing a key while the item is being dragged in the first window.

24. A method to manipulate a window in a data processing system, the method comprising:

receiving an input for an item in a first window wherein the input shows a positioning of the item over an area of the first window, said first window being in a first state in which the first window has borders defining an area which is only partially viewable on a first screen, said area being at least partially obscured by a menu region which is displayed on said first screen and being at least partially obscured by one of a second window or an icon;

determining whether the first window is partially off-screen, if the item is intended to be dropped in the first window;

automatically displaying the first window in a second state in which the first window is more accessible that includes repositioning the first window to reveal a portion of the first window, the portion of the first window being off-screen when the first window is in the first state, while continuing to obscure said first window by said menu region, if it is determined that the first window is partially off-screen; and returning the first window from the second state to the first state if the item is not dropped in the first window that includes repositioning the portion of the first window back off-screen to its original position in the first state.

25. A method as in claim 24 further comprising:

determining that the menu region obscures a portion of the first window; and displaying, in response to said determining, the portion of the first window.

26. A method as in claim 25 wherein said displaying the portion of the first window comprises:

resizing the first window.

27. A method as in claim 25 wherein said displaying the portion of the first window comprises:

repositioning the first window on the first screen.

28. A method as in claim 24 wherein the menu region is displayed at a border of the first screen.

29. A non-transitory machine readable medium storing executable computer program instructions which when executed by a data processing system cause said system to perform a method to manipulate a window in the data processing system, the method comprising:

receiving an input for an item in a first window wherein the input shows a positioning of the item over an area of the first window, said first window being in a first state in which the first window has borders defining an area which is only partially viewable on a first screen, said area being at least partially obscured by a menu region which is displayed on said first screen and being at least partially obscured by one of a second window or an icon;

determining whether the first window is partially off-screen, if the item is intended to be dropped in the first window;

automatically displaying the first window in a second state in which the first window is more accessible that includes repositioning the first window to reveal a portion of the first window, the portion of the first window being off-screen when the first window is in the first state, while continuing to obscure said first window by said menu region, if it is determined that the first window is partially off-screen; and returning the first window from the second state to the first state if the item is not dropped in the first window that includes repositioning the portion of the first window back off-screen to its original position in the first state.

30. A non-transitory medium as in claim 29 wherein the method further comprises:

determining that the menu region obscures a portion of the first window; and displaying, in response to said determining, the portion of the first window.

31. A non-transitory medium as in claim 30 wherein said displaying the portion of the first window comprises:

resizing the first window.

32. A non-transitory medium as in claim 30 wherein said displaying the portion of the first window comprises:

repositioning the first window on the first screen.

33. A non-transitory medium as in claim 29 wherein the menu region is displayed at a border of the first screen.

34. A data processing system to manipulate a window in a graphical user interface system, the data processing system comprising:

means for receiving an input for an item in a first window wherein the input shows a positioning of the item over an area of the first window, said first window being in a first state in which the first window has borders defining an area which is only partially viewable on a first screen, said area being at least partially obscured by a menu region which is displayed on said first screen and being at least partially obscured by one of a second window or an icon;

determining whether the first window is partially off-screen, if the item is intended to be dropped in the first window;

means for automatically displaying the first window in a second state in which the first window is more accessible that includes repositioning the first window to reveal a portion of the first window, the portion of the first window being off-screen when the first window is in the first state, while continuing to obscure said first window by said menu region, if it is determined that the first window is partially off-screen; and means for returning the first window from the second state to the first state if the item is not dropped in the first window that includes repositioning the portion of the first window back off-screen to its original position in the first state.

35. A data processing system as in claim 34 wherein the menu region is displayed as a border of the first screen.

\* \* \* \* \*